(12) United States Patent
Kumar et al.

(10) Patent No.: US 10,635,378 B2
(45) Date of Patent: *Apr. 28, 2020

(54) SYSTEMS AND METHODS FOR PROVIDING VIRTUAL MONITORS

(71) Applicant: CITRIX SYSTEMS, INC., Fort Lauderdale, FL (US)

(72) Inventors: Rakesh Kumar, Fort Lauderdale, FL (US); Chandrasekhara Reddy, Bangalore (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,027

(22) Filed: Apr. 29, 2019

(65) Prior Publication Data

US 2019/0250874 A1 Aug. 15, 2019

Related U.S. Application Data

(63) Continuation of application No. 15/982,301, filed on May 17, 2018, now Pat. No. 10,318,232, which is a continuation of application No. 14/300,078, filed on Jun. 9, 2014, now Pat. No. 9,990,170.

(51) Int. Cl.
*G09G 5/36* (2006.01)
*G06F 3/14* (2006.01)
*G06T 19/00* (2011.01)
*G09G 5/14* (2006.01)
*G06F 9/451* (2018.01)
*G06F 9/455* (2018.01)

(52) U.S. Cl.
CPC ............ *G06F 3/1454* (2013.01); *G06F 9/452* (2018.02); *G06F 9/45558* (2013.01); *G06T 19/006* (2013.01); *G09G 5/14* (2013.01); *G06F 2009/45562* (2013.01); *G06T 2210/21* (2013.01); *G06T 2210/52* (2013.01); *G06T 2219/016* (2013.01); *G09G 2370/022* (2013.01); *G09G 2370/20* (2013.01)

(58) Field of Classification Search
CPC .. G06F 9/45533; G06F 3/1423; G06F 9/5077; G06F 2009/4557; G06F 9/4443; G06F 3/1454; G09G 5/14

See application file for complete search history.

(56) References Cited

U.S. PATENT DOCUMENTS

| 9,286,082 | B1 | 3/2016 | Hobbs |
| 2009/0083655 | A1 | 3/2009 | Beharie et al. |
| 2010/0293504 | A1 | 11/2010 | Hachiya |
| 2011/0246904 | A1 | 10/2011 | Pinto et al. |
| 2012/0011280 | A1 | 1/2012 | Gilboa |

*Primary Examiner* — Hau H Nguyen
(74) *Attorney, Agent, or Firm* — Allen, Dyer, Doppelt + Gilchrist, PA

(57) ABSTRACT

A virtual server includes one or more processors that execute instructions to generate a virtual desktop, and generate an active virtual monitor and a paused virtual monitor for the generated virtual desktop. A first portion of the generated virtual desktop is assigned to the active virtual monitor, and a second portion of the generated virtual desktop is assigned to the paused virtual monitor. The active and paused virtual monitors each have a respective allocated memory. The amount of memory allocated for the paused virtual monitor is less than the amount of memory allocated for the active virtual monitor. A captured image of at least one of the first and second portions of the generated virtual desktop is provided for presenting on a physical monitor of a client device.

20 Claims, 17 Drawing Sheets

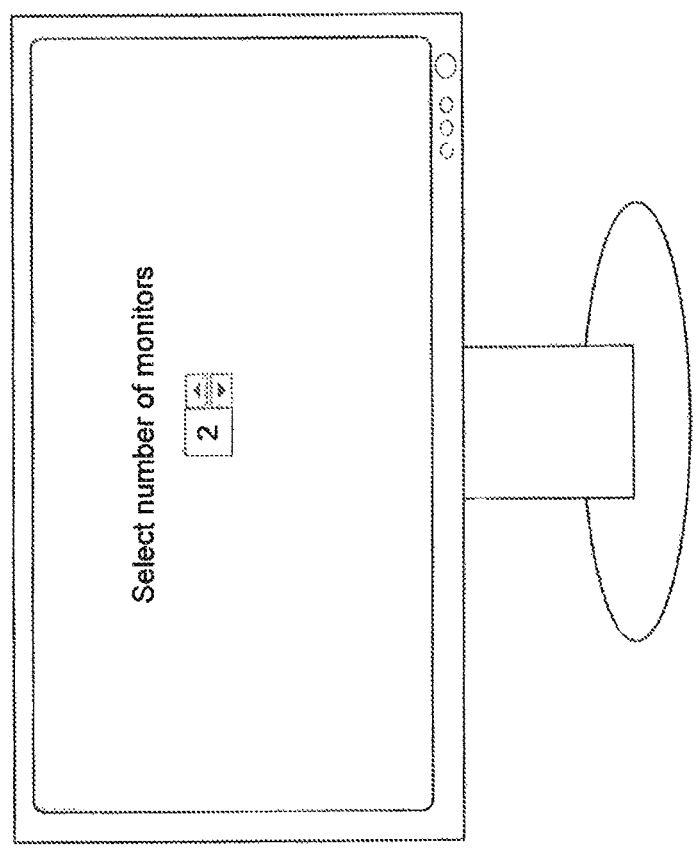

| Physical Monitor Coordinates | Virtual Monitor Coordinates | |
|---|---|---|
| $X_1, Y_1$ | Virtual Monitor A 1020A | $X_1, Y_1 + Y_N$ |
| | Virtual Monitor B 1020B | $X_1 + X_N, Y_1 + Y_N$ |
| | Virtual Monitor C 1020C | $X_1, Y_1$ |
| | Virtual Monitor D 1020D | $X_1 + X_N, Y_1$ |

SYSTEMS AND METHODS FOR PROVIDING VIRTUAL MONITORS

RELATED APPLICATION

This application is a continuation of U.S. patent application Ser. No. 15/982,301 filed May 17, 2018, which is a continuation of U.S. patent application Ser. No. 14/300,078 filed Jun. 9, 2014, which is hereby incorporated herein in its entirety by reference.

BACKGROUND

Virtualization technologies have become widely used in recent years. "Virtualization" typically refers to creating a virtual version of a physical device or resource. Many computing technologies can be virtualized, such as computing devices, servers, desktops, storage devices, networks, operating systems, and applications. In a hardware virtualization environment, sometimes also referred to as a platform virtualization environment, a virtual machine can simulate a physical computer running a certain operating system. In particular, software executed on these virtual machines can be separated from the underlying hardware resources. As a result, virtual machines running on the same host computer can each simulate separate computers running separate operating systems. For example, a computer can host a virtual machine that simulates a computer running a Linux operating system, based on which Linux-based software can be executed, and can also host a different virtual machine that simulates a computer running a Windows™ operating system, based on which Windows™-based software can be executed.

Users of physical client devices can access a virtualization environment to view and interact with virtual desktops hosted on virtual machines. Application virtualization can be used with desktop virtualization to provide users with a comprehensive virtual desktop environment in which all of the components of a desktop are virtualized. For example, a user of a client device could request a virtual desktop of a virtual machine running a Microsoft Windows™ 7 operating system, which could emulate a desktop of a Microsoft Windows™ 7 operating system operating on a physical computing device. The user could select to open a virtual Microsoft™ Word application from the hosted virtual desktop, and a virtual Microsoft™ Word application could open that emulates a Microsoft™ Word application that would open on a physical computing device running a Microsoft Windows™ 7 operating system.

There are many advantages to providing virtual desktop environments. For example, applications and operating systems can be stored at a central location, and provided on demand to users of a variety of different types of devices running a variety of different operating systems from a variety of different locations. Virtual desktop environments can also allow network administrators to better control access to sensitive information, because all of the information can be stored at a central location and streamed to users on demand during hosted virtual desktop sessions. Virtual desktop environments can further provide users with better systems for backing up information, because all of the information can be stored at a central location that has better or more redundant systems for backing up the information.

A desktop virtualization environment, however, remains an emulation of a physical environment, and certain features of a physical computing environment may not be implemented well in the emulation. For example, physical computing devices often provide for the use of multiple physical monitors, sometimes referred to as a "multi-monitor" mode. The use of multiple physical monitors can allow a user to extend the size of the desktop in which the user is working across multiple physical monitors, so that the desktop area in which the user can work and run applications is larger. For example, using two 1024×768 pixel resolution physical monitors can allow a user to use a 2048×768 pixel desktop image across the two physical monitors. This can allow a user to have one application opened in full screen on one of the physical monitors, while having a different application opened in fill screen on the other physical monitor.

There are many advantages to running applications on multiple physical monitors. Industries, such as the financial services, architecture, graphic design, manufacturing, engineering, and video editing industries, rely heavily on the use of applications that display information that is constantly being updated over time. For example, a stockbroker may use an application that displays a list of stock prices or charts that are updated frequently throughout the day. For users running such applications, it may be important to leave the applications open throughout the day so that they can quickly view changes to the displayed information.

In desktop virtualization environments, such a multiple physical monitor setup may not be emulated, unless the client device requesting a hosted virtual desktop has multiple physical monitors. For example, a hosted virtual desktop of 2048×768 pixel resolution may be provided to a user of a client device having two 1024×768 pixel resolution physical monitors. A user of a client device with a limited number of physical monitors, however, may wish to run a large number of applications simultaneously on a hosted virtual desktop. Moreover, a user may wish to simultaneously run a greater number of applications than the number of physical monitors at the client device, and may wish to run each of these applications in a full screen mode.

But current methods and systems are limited. These current technologies are not capable of providing a user of a client device using a hosted virtual desktop with a number of virtual monitors that is greater than the number of physical monitors connected to the client device. Also, these current technologies do not allow a user of a client device to easily create a number of virtual monitors.

SUMMARY

A virtual server includes one or more processors that execute instructions to generate a virtual desktop, and generate at least one active virtual monitor and at least one paused virtual monitor for the generated virtual desktop. A first portion of the generated virtual desktop is assigned to the at least one active virtual monitor, and a second portion of the at least one generated virtual desktop is assigned to the at least one paused virtual monitor. The active and paused virtual monitors each have a respective allocated memory, wherein the amount of memory allocated for the at least one paused virtual monitor is less than the amount of memory allocated for the at least one active virtual monitor. A captured image of at least one of the first and second portions of the generated virtual desktop is provided for presenting on a physical monitor of a client device.

An additional portion of the generated virtual desktop is not assigned to the at least one active virtual monitor and the at least one paused virtual monitor, and the captured image of the at least one of the first and second portions of the generated virtual desktop does not include the additional portion.

The one or more processors may further execute the instructions to identify a number of virtual monitors associated with the generated virtual desktop, and identify characteristics of the virtual monitors, with the at least one active virtual monitor and the at least one paused virtual monitor being generated based at least in part on the identified characteristics.

The generated virtual desktop may be a virtualization of a desktop implemented on a physical computing device that is remote from the client device, and the characteristics correspond to characteristics of a physical monitor connected to the physical computing device. The characteristics may correspond to characteristics of the physical monitor of the client device. The characteristics may include at least one of an aspect ratio, resolution, dimension, type, refresh rate, number of pixels, video format, or contrast of the virtual monitors.

The one or more processors may further execute the instructions to receive an indication of a user selection to switch to the at least one paused virtual monitor, and provide the captured image of the second portion of the generated virtual desktop for presenting on the physical monitor of the client device in response to the received indication.

The one or more processors may further execute the instructions to identify first coordinates associated with a pointer displayed on the physical monitor of the client device, map the first coordinates to second coordinates associated with the first or second portion of the generated virtual desktop, and provide the pointer for display in the image of the first or second portion of the generated virtual desktop based on the mapping.

The virtual server may further comprise a first frame buffer associated with the first portion, and a second frame buffer associated with the second portion. The captured image is stored in the first frame buffer or the second frame buffer, and the first frame buffer is updated at a higher frequency than the second frame buffer.

Another aspect is directed to a method for providing virtual monitors comprising generating a virtual desktop, and generating at least one active virtual monitor and at least one paused virtual monitor for the generated virtual desktop. A first portion of the generated virtual desktop is assigned to the at least one active virtual monitor, and a second portion of the at least one generated virtual desktop is assigned to the at least one paused virtual monitor. The active and paused virtual monitors each have a respective allocated memory, wherein the amount of memory allocated for the at least one paused virtual monitor is less than the amount of memory allocated for the at least one active virtual monitor. The method further includes providing a captured image of at least one of the first and second portions of the generated virtual desktop for presenting on a physical monitor of a client device.

Yet another aspect is directed to a non-transitory computer readable medium for operating a virtual server, and with the non-transitory computer readable medium having a plurality of computer executable instructions for causing the virtual server to perform steps as described above.

BRIEF DESCRIPTION OF THE DRAWINGS

Reference will now be made to the accompanying drawings showing exemplary embodiments of the disclosure. In the drawings:

FIG. 5A is an exemplary screen of an exemplary user interface for selecting a number of virtual monitors, consistent with embodiments of the present disclosure;

FIG. 11 illustrates an exemplary table for converting a coordinate system of a physical monitor to a coordinate system of a virtual desktop;

DETAILED DESCRIPTION

Figure 1:
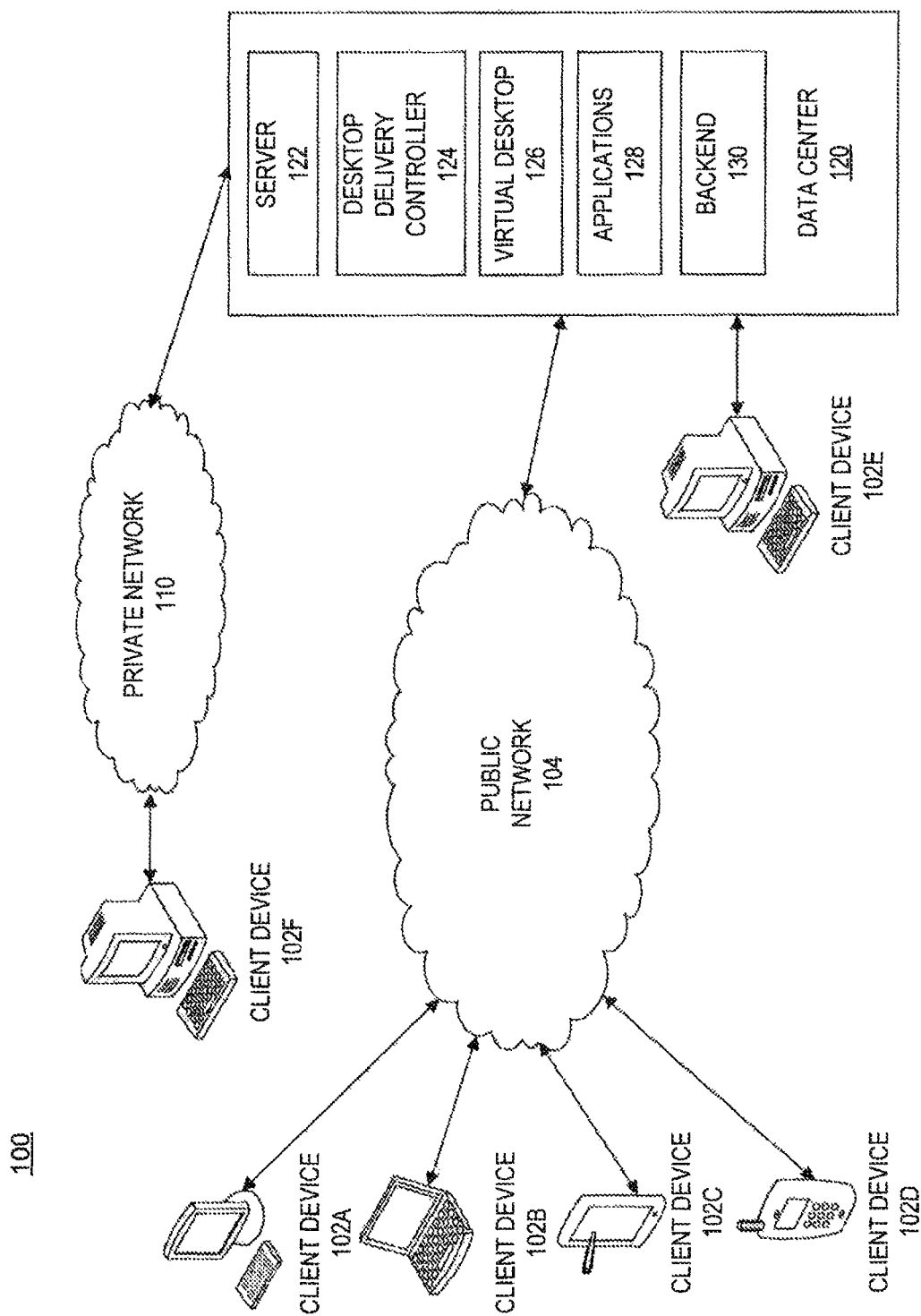
FIG. 1 illustrates an exemplary computing environment for implementing embodiments and features consistent with the present disclosure.

Reference will now be made in detail to the present embodiments of the disclosure, certain examples of which are illustrated in the accompanying drawings.

Embodiments of the present disclosure relate to computerized systems and methods for providing virtual monitors. Embodiments of the present disclosure include systems and methods that can generate virtual monitors based on user selections at a client device. For example, a user of a client device having a certain number of physical monitors can request a certain number of virtual monitors in which to run applications in a hosted virtual desktop. By requesting a number of virtual monitors the user may, for example, display each application in a respective virtual monitor in full screen. In accordance with embodiments of the present disclosure, a number of virtual monitors in which to display the hosted virtual desktop can be determined, characteristics for the virtual monitors can be identified, and the number of virtual monitors can be generated based at least in part on the characteristics. Once the virtual monitors have been created, portions of the hosted virtual desktop can be presented in the virtual monitors based on the number of virtual monitors.

The computer-implemented methods disclosed herein can be executed, for example, by one or more processors that receive instructions from one or more non-transitory computer-readable storage mediums. Similarly, systems consistent with the present disclosure can include at least one processor and memory, and the memory can be a non-transitory computer-readable medium.

As used herein, a non-transitory computer-readable storage medium refers to any type of physical memory on which information or data readable by a processor can be stored. Examples include random access memory (RAM), read-only memory (ROM), volatile memory, nonvolatile memory, hard drives, compact disc read-only memory (CD ROM), digital versatile disc (DVD) memory, flash drives, magnetic strip storage, semiconductor storage, optical disc storage, magneto-optical disc storage, and/or any other known physical storage medium. Singular terms, such as "memory" and "computer-readable storage medium," can additionally refer to multiple structures, such as a plurality of memories and/or computer-readable storage mediums.

Embodiments of the present disclosure relate to computerized systems and methods for providing virtual monitors. In addition, embodiments of the present disclosure relate to solutions for generating virtual monitors based on identified characteristics for the virtual monitors, and for providing at least a portion of the hosted virtual desktop for display in one of the generated virtual monitors based on the number of virtual monitors.

In accordance with the present disclosure, there is provided a computerized system for providing virtual monitors. The system comprises a memory device storing instructions, and one or more processors that execute the instructions. The one or more processors execute the instructions to identify a number of virtual monitors in which to display a virtual desktop, and identify characteristics for one of the virtual monitors. The one or more processors also execute the instructions to generate a virtual monitor based at least in part on the identified characteristics, and assign a portion of the virtual desktop to the virtual monitor, the portion being determined based at least in part on the identified number. The one or more processors further execute the instructions to capture an image of the portion of the virtual desktop from the virtual monitor, and provide the captured image for presenting on a physical monitor of a client device.

Furthermore, in accordance with the present disclosure, there is provided a computer-implemented method for providing virtual monitors. The method comprises operations performed by one or more processors. The operations include identifying a number of virtual monitors in which to provide a virtual desktop, and identifying characteristics for one of the virtual monitors. The operations also include generating a virtual monitor based at least in part on the identified characteristics, and assigning a portion of the virtual desktop to the virtual monitor, the portion being determined based at least in part on the identified number. The operations further include capturing an image of the portion of the virtual desktop from the virtual monitor, and providing the captured image for presenting on a physical monitor of a client device.

Additionally, in accordance with the present disclosure, there is provided a non-transitory computer-readable medium that stores instructions. The instructions, when executed by one or more processors, cause the one or more processors to perform a method. The method comprises identifying a number of virtual monitors in which to display a virtual desktop, and identifying characteristics for one of the virtual monitors. The method also comprises generating a virtual monitor based at least in part on the identified characteristics, and assigning a portion of the virtual desktop to the virtual monitor, the portion being determined based at least in part on the identified number. The method further comprises capturing an image of the portion of the virtual desktop from the virtual monitor, and providing the captured image for presenting on a physical monitor of a client device.

Before explaining example embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purposes of description and should not be regarded as limiting.

The accompanying drawings, which are incorporated and constitute part of the specification, illustrate certain embodiments of the disclosure, and together with the description, serve to explain the principles of the disclosure.

As such, those skilled in the art will appreciate that the conception upon which the disclosure is based can readily be utilized as a basis for designing other structures, methods, and/or systems for carrying out the several purposes of the present disclosure. It is important, therefore, to recognize that the claims should be regarded as including such equivalent constructions insofar as they do not depart from the spirit and scope of the present disclosure.

FIG. 1 is a block diagram of an exemplary computing environment 100 for implementing embodiments and features of the present disclosure. The arrangement and number of components in environment 100 is provided for purposes of illustration. Additional arrangements, number of components, and other modifications can be made, consistent with the present disclosure.

As shown in FIG. 1, computing environment 100 can include any combination of one or more client devices 102A-F, public network(s) 104, private network(s) 110, and data center(s) 120. While client devices 102A-F are depicted as a computer (e.g., client devices 102A, 102E, and 102F), a laptop (e.g., client device 102B), a tablet (e.g., client device 102C), and a mobile smart phone (e.g., client device 102D), the disclosure is not so limited. One or more of client devices 102A-F could be, for example, a mobile phone, smart phone, tablet, netbook, electronic reader, personal digital assistant (PDA), personal computer, laptop computer, smart watch, gaming device, desktop computer, set-top box, television, personal organizer, portable electronic device, smart appliance, navigation device, and/or other types of computing devices. In some embodiments, a client device 102A-F can be implemented with hardware devices and/or software applications running thereon. A user can use a client device 102A-F to communicate with one or more other client devices 102A-F and/or data center(s) 120 over public network(s) 104 and/or private network(s) 110. A client device 102A-F can communicate by transmitting data to and/or receiving data from other client device(s) 102A-F and/or data center(s) 120 over public network(s) 104 and/or private network(s) 110. Although FIG. 1 illustrates six client devices, the disclosure is not so limited. Computing environment 100 can include any number of client devices, and/or any combination of types of client devices.

Computing environment 100 can also include one or more public networks 104 and/or private networks 110. Public network(s) 104 and/or private network(s) 110 can connect and provide for the exchange of information among client device(s) 102A-F, among data center(s) 120, and/or between client device(s) 102A-F and data center(s) 120. Public network(s) 104 and/or private network(s) 110 can include one or more types of networks interconnecting client device(s) 102A-F and/or data center(s) 120. For example, one client device 102A-F can communicate with a data center 120 using a different type of network than a second client device 102A-F.

Public network(s) 104 and/or private network(s) 110 can be implemented using one or more networks, which can include one or more wide area networks (WANs), metropolitan area networks (MANs), local area networks (LANs), or personal area networks (PANs), or any combination of these networks. Public network(s) 104 and/or private network(s) 110 can include any one or more types of networks, including Internet, intranet, Ethernet, twisted-pair, coaxial cable, fiber optic, cellular, satellite, IEEE 802.11, terrestrial, and/or other types of wired or wireless networks.

Computing environment 100 can further include one or more data centers 120. A data center 120 can be a central repository, either physical or virtual, for the storage, management, and/or dissemination of data and/or information pertaining to a particular public and/or private entity. A data center 120 can include one or more physical servers, virtual servers, storage systems, web servers, databases, mainframe computers, general-purpose computers, personal computers, or other types of computing devices. A data center can include, among other things, one or more servers (e.g., server(s) 122), desktop delivery controller(s) 124, virtual desktop(s) 126, application(s) 128, and backend system(s) 130. In some embodiments, a data center can be configured to store information, retrieve information, receive information, and/or provide information. A data center 120 can be a standalone computer system or apparatus, or can include and/or be part of a larger system. For example, a data center 120 can represent one or more computing components, such as server(s) 122, that can communicate with one another over a communications network, or over a dedicated network, such as a LAN. A data center 120 can include one or more backend systems 130 for carrying out one or more aspects of the present disclosure.

A data center 120 can be implemented as a system comprising a plurality of servers, or a server farm comprising a load balancing system and a plurality of servers. In some embodiments, a data center 120 can include one or more servers 122 with hardware devices and/or software applications running thereon. Data center(s) 120 can communicate with client device(s) 102A-F over public network(s) 104 and/or private network(s) 110. One or more of client devices 102A-F can acquire remote services from data center(s) 120 through various means. For example, client devices 102A-F can communicate with data center 120 either directly (e.g., client device 102E) or indirectly through public network(s) 104 (e.g., client devices 102A-D) and/or private network(s) 110 (e.g., client device 102F).

A server 122 can be an entity represented by an Internet Protocol (IP) address, and can exist as a single entity or as a, member of a server farm. A server 122 can be a physical server or a virtual server. In some embodiments, a server 122 can include one or more hardware layers, operating systems, and/or hypervisors creating and/or managing one or more virtual machines. A server 122 can provide one or more services to an endpoint, such as a client 102A-F. These services can include providing one or more virtual desktops operating on one or more virtualized platforms and/or one or more applications 128 to one or more endpoints (e.g., client devices 102A-F). For example, application(s) 128 can include physical and/or virtualized application(s) and/or resource(s) based on any type of platform, such as a Windows™-based or SAP™-based system. Server(s) 122 can communicate with other devices (e.g., client devices 102A-F) through various types of networks (e.g, private network(s) 110 and/or public network(s) 104).

Desktop delivery controller(s) 124 can enable delivery of services, such as virtual desktops 126 to client devices (e.g., client devices 102A-F). Desktop delivery controller(s) 124 can be implemented in software and/or hardware within a computer system, such as computer system 200 of FIG. 2. Desktop delivery controller(s) 124 can provide functionality to manage, maintain, and/or optimize virtual desktop communications.

In some embodiments, desktop delivery controller(s) 124 can control, manage, maintain, and/or optimize the provisioning of one or more applications 128. In some embodiments, one or more virtual desktops 126 can provide one or more application(s) 128. A virtual desktop 126 can include a shared desktop allowing users to access a single shared remote-desktop-services desktop, a virtual desktop infrastructure (VDI) desktop allowing a user to have his/her own virtual machine, a streaming disk image, a local virtual machine, individual applications (e.g., one or more of applications 128), or a combination thereof.

Backend system(s) 130 can include a single or multiple instances of computer networking hardware, appliances, and/or servers in a server farm or a group of servers. Backend system(s) 130 can interface directly or indirectly with server(s) 122. For example, backend system(s) 130 can provide Microsoft Active Directory services, which can provide a number of network services, including one or more of lightweight directory access protocol (LDAP) directory services, Kerberos-based authentication services, domain name system (DNS) based naming and other network information services, and/or synchronization of directory updates amongst server(s) 122. Backend system(s) 130 can also include, among other things, one or more Oracle-based backend server(s), structured query language (SQL) server backends, and/or dynamic host configuration protocol (DIICP) server backends. Backend system(s) 130 can provide data, services, or a combination of both to data center(s) 120, which can then provide that information via one or more forms to client device(s) 102A-F and/or branch office(s) (not shown).

Figure 2A:
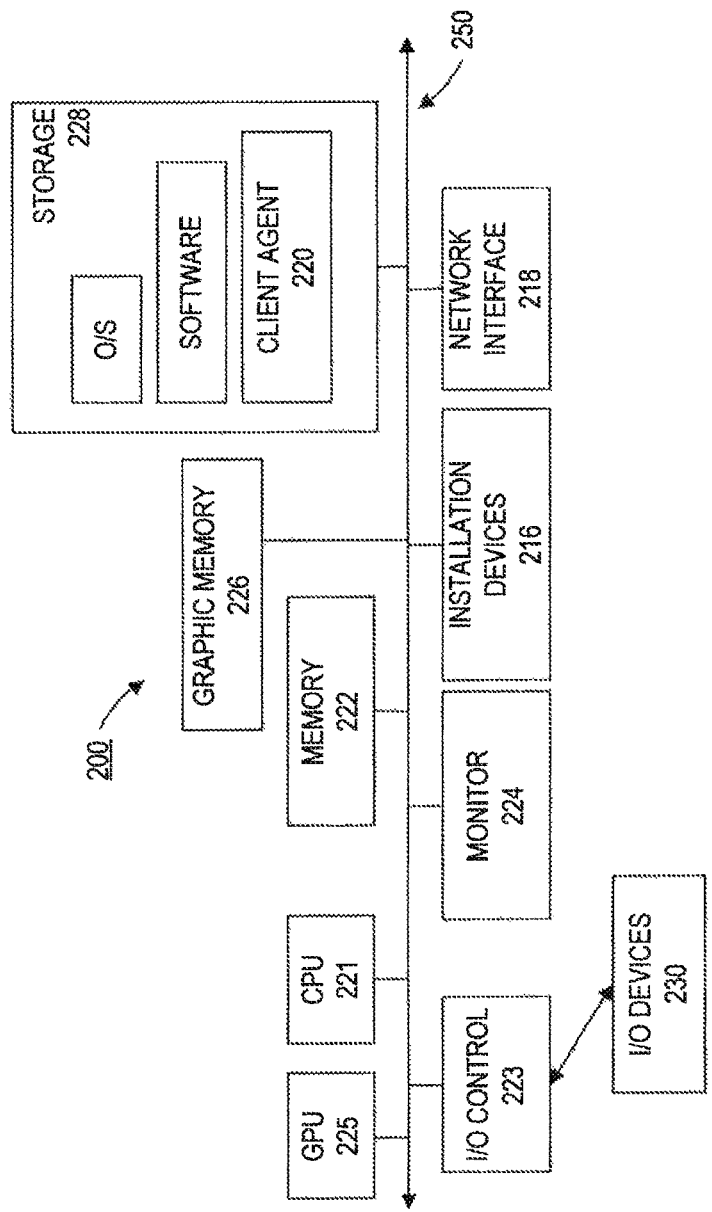
FIG. 2A illustrates an exemplary computer system for implementing embodiments and features consistent with the present disclosure.
Figure 2B:
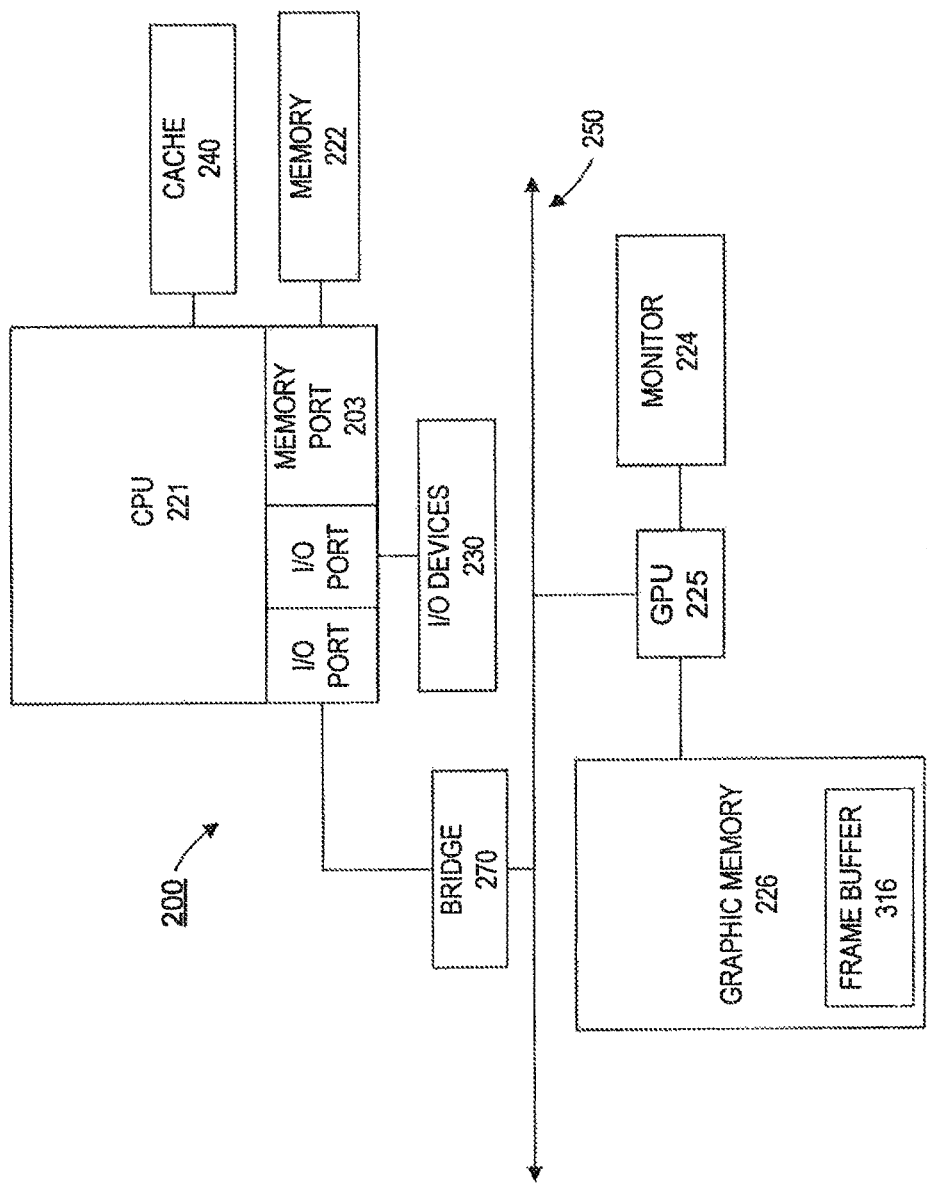
FIG. 2B illustrates another exemplary computer system for implementing embodiments and features consistent with the present disclosure.

FIGS. 2A-2B are block diagrams illustrating an exemplary computer system 200 that can be used for implementing embodiments consistent with the present disclosure, including the exemplary systems and methods described herein. A computer system 200 can be used to implement server(s) 122, backend system(s) 130, desktop delivery controller(s) 124, and/or client device(s) 102A-F. The arrangement and number of components in computer system

200 is provided for purposes of illustration. Additional arrangements, number of components, or other modifications can be made, consistent with the present disclosure.

As shown in FIGS. 2A-2B, a computer system 200 can include one or more central processing units (CPUs) 221 for executing instructions. CPUs suitable for the execution of instructions include, by way of example, both general and special purpose CPUs, and any one or more processors of any kind of digital computer. CPU(s) 221 can include any logic circuitry that responds to and processes instructions received from one or more memories 222 and/or storage devices 228. CPU(s) 221 can include a single or multiple microprocessors, field-programmable gate arrays (FPGAs), or digital signal processors (DSPs) capable of executing particular sets of instructions stored in one or more memories 222, storage devices 228, and/or caches (e.g., cache(s) 240).

A computer system 200 can include one or more memories 222, storage devices 228, and/or caches 240, configured to store data and/or software instructions used by CPU(s) 221 to perform operations consistent with disclosed embodiments. For example, computer system 200 can include one or more memories 222 and/or storage devices 228 configured to store one or more software programs that, when executed by CPU(s) 221, cause CPU(s) 221 to perform functions and/or operations consistent with disclosed embodiments. By way of example, a memory 222 and/or storage device 228 can include one or more tangible non-transitory computer-readable mediums, such as NOR or NAND flash memory devices, flexible disks, hard disks, read-only memories (ROMs), random access memories (RAMs), compact disk read-only memories (CD ROMs), magneto-optical (MO) drives, digital versatile disk read-only memories (DVD-ROMs), digital versatile disk random-access memories (DVD-RAMs), semiconductor memories, tape drives, redundant array of independent disks (RAID arrays), etc. A memory 222 and/or storage device 228 can include one or more memory chips capable of storing data and/or allowing storage locations to be directly accessed by CPU(s) 221. In some embodiments, CPU(s) can communicate with one or more memories 222 and/or storage devices 228 via a system bus 250. A computer system 200 can include any number of memories 222 and/or storage devices 228. Memories 222 and/or storage devices 228 can be located remotely and computer system 200 can be able to access other memories 222 and/or storage devices 228 via a network, such as private network(s) 110 and/or public network(s) 104. One or more memories 222 and/or storage devices 228 can be configured to store data, and can store data received from one or more server(s) 122, backend system(s) 130, and/or client device(s) 102A-F. One or more memories 222 and/or storage devices 228 can also store one or more operating systems, application software programs, and/or other software.

A computer system 200 can also include one or more graphics processing units (GPUs) 225. A CPU 225 can be any type of specialized circuitry that can manipulate and alter memory (e.g., a graphic memory 226) to provide and/or accelerate the creation of images stored in a frame buffer (e.g., frame buffer 316 shown in FIG. 2B) for output to one or more physical monitors (e.g., physical monitor(s) 224). GPUs can have a highly parallel structure making them more effective than general-purpose CPUs 221 for algorithms where processing of large blocks of graphical data can be performed in parallel. Furthermore, the functionality of one or more GPUs 225 can also be included in a chipset in some other type of special purpose processing unit or co-processor.

CPU(s) 221 can connect to system interface(s) 250, and can connect with one or more memories 222 and/or storage devices 228 over system interface(s) 250. CPU(s) 221 can also communicate with one or more memories 222 and/or storage devices 228 over a serial communication bus and/or using point-to-point communication. Similarly, GPU(s) 225 can communicate with one or more graphic memories 226, memories 222, and/or storage devices 228 using system interface(s) 250 and/or using other types of busses. CPU(s) 221 can execute programming instructions stored in one or more memories 222, operate on data stored in one or more memories 222, and/or communicate with GPU(s) 225 through system interface(s) 250, which bridge communication between CPU(s) 221 and GPU(s) 225. In some embodiments, CPU(s) 221, GPU(s) 225, system interface(s) 250, or any combination thereof, can be integrated into a single processing unit, GPU(s) 225 can be capable of executing particular sets of instructions stored in one or more memories 222 to manipulate graphical data stored in one or more memories 222 and/or one or more graphic memories 226. For example, CPU(s) 225 can receive instructions transmitted by CPU(s) 221 and process the instructions in order to render graphics data stored in one or more graphic memories 226. A graphic memory 226 can be any memory accessible by GPU(s) 225, including a local memory, a system memory, an on-chip memory, a hard disk, and/or any other type of memory 222 or storage device 228. GPU(s) 225 can enable displaying of graphical data stored in one or more graphic memories 226 on physical monitor(s) 224.

A computer system 200 can also include one or more physical monitors 224 for displaying data and information. Physical monitor(s) 224 can be implemented using one or more display panels, which can include, for example, one or more cathode ray tube (CRT) displays, liquid crystal displays (LCDs), plasma displays, light emitting diode (LED) displays, touch screen type displays, projector displays (e.g., images projected on a screen or surface, holographic images, etc.), organic light emitting diode (OLED) displays, field emission displays (FEDs), active matrix displays, vacuum fluorescent (VFR) displays, 3-dimensional (3-D) displays, electronic paper (e-ink) displays, microdisplays, or any combination of the above types of displays.

A computer system 200 can further include one or more input/output (I/O) devices 230 connected through an I/O controller 223, both of which can communicate via system interface(s) 250. An I/O device 230 can include, for example, one or more keys, buttons, keyboards, mice, joysticks, styluses, gesture sensors (e.g., video cameras), and/or voice sensors (e.g., microphones). Keys, keyboards, and/or buttons can be physical and/or virtual (e.g., provided on a touch screen interface). I/O device(s) 230 can also include a storage device and/or an installation medium for one or more of client devices 102A-F.

A computer system 200 can support one or more installation devices 216, such as floppy disk drives for receiving floppy disks (e.g., 3.5-inch, 5.25-inch, or Zip Disks), CD-ROM drives, CD-R/RW (readable/rewritable compact disc) drives, DVD-ROM drives, tape drives, universal serial bus (USB) devices, hard-drives, and/or any other device suitable for installing software and programs, such as a client agent 220, or portion thereof. Installation device(s) 216 could also be used as storage device(s) 228.

A computer system 200 can further include one or more network interfaces 218 for interfacing to a network, such as a PAN, LAN, MAN, WAN, and/or the Internet through a variety of connections, including, but not limited to, standard telephone lines, LAN or WAN links (e.g., 802.11, T1, T3, 56 kb, X.25), broadband connections (e.g., integrated services digital network (ISDN), Frame Relay, asynchronous transfer mode (ATM)), wireless connections, or some combination of any or all of the above. Network interface(s) 218 can comprise a built-in network adapter, network interface card, personal computer memory card international association (PCMCIA) network card, card bus network adapter, wireless network adapter, USB network adapter, modem, and/or any other device suitable for interfacing computer system 200 to any type of network.

As illustrated in FIG. 2B, CPU(s) 221 of a computer system 200 can communicate directly with one or more memories 222 via one or more memory ports 203, and similarly GPU(s) 225 can communicate directly with one or more graphic memories 226. CPU(s) 221 can also communicate with cache(s) 240 via one or more secondary busses, sometimes referred to as backside busses. In some embodiments, CPU(s) 221 can communicate with cache(s) 240 via system interface(s) 250. A cache 240 can have a faster response time than a memory 222. In some embodiments, such as in the embodiments illustrated in FIG. 2B, CPU(s) 221 can communicate directly with I/O device(s) 230 via one or more I/O ports. In further embodiments, I/O device(s) 230 can include one or more bridges 270 between system interface(s) 250 and one or more external communication busses, such as USB busses, Apple Desktop Busses, RS-232 serial connections, small computer system interface (SCSI) busses, FireWire busses, Ethernet busses, ATM busses, high performance parallel interface (HIPPI) busses, Super HIPPI busses, SerialPlus busses, SCI/LAMP busses, FibreChannel busses, and/or Serial Attached small computer system interface busses.

As shown in FIG. 2B, CPU(s) 225 can also communicate directly with one or more graphic memories 226, memories 222, storage devices 228, and/or monitor(s) 224. GPU(s) 225 can communicate with CPU(s) 221 and/or other devices through system interface(s) 250. One or more graphic memories 226 can also include one or more frame buffers 316. A frame buffer 316 can be a graphic output device that drives one or more physical monitors (e.g., physical monitor(s) 224) from one or more memory buffers of one or more graphic memories 226 containing a complete frame of graphical data. Frame buffer(s) 316 can store one or more final graphical frames, which are to be displayed on physical monitor(s) 224.

Figure 3:
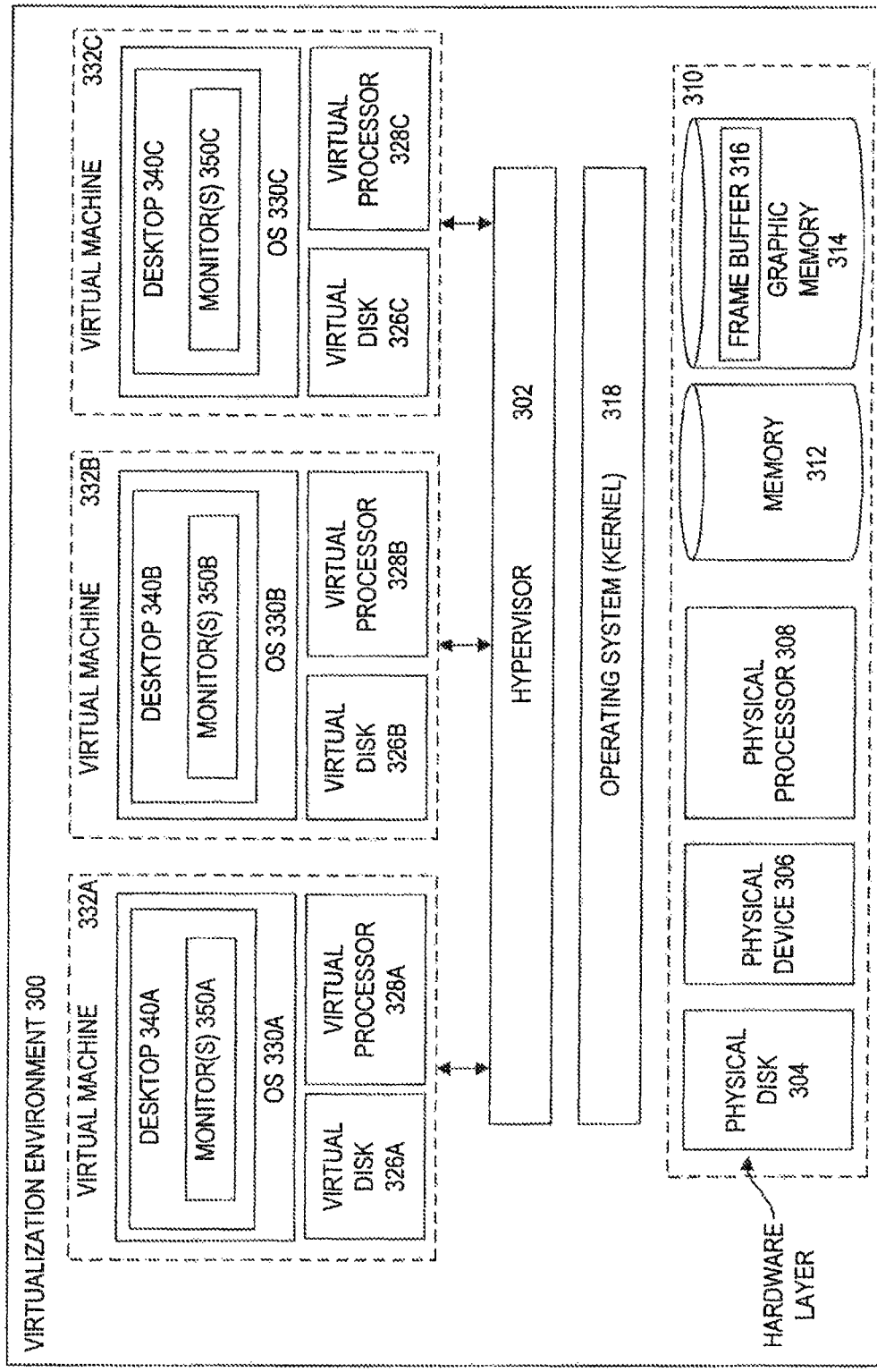
FIG. 3 is a block diagram of an exemplary virtualization environment, consistent with embodiments of the present disclosure.

FIG. 3 is a block diagram illustrating an exemplary virtualization environment 300. In some embodiments, virtualization environment 300 can be implemented on a computer system 200 (e.g., server 122 and/or client device 102A-F). A computer system 200 that implements a virtualization environment 300 can be referred to as a host computer system. In some embodiments, the modules, programs, virtual machines, and/or commands stored and/or executed by virtualization environment 300 can be executed by more than one computer system 200. For example, virtualization environment 300 can be implemented by a data center 120, such as a data center 120 including a server farm.

Virtualization environment 300 can include a hardware layer 310 that can include one or more physical disks 304, one or more physical devices 306, one or more physical processors 308, one or more memories 312, and one or more graphical memories 314. In some embodiments, one or more frame buffers 316 can be stored within one or more memory elements in one or more graphic memories 314, and can be accessed by one or more physical processors 308.

A physical disk 304 can be either an internal or an external physical hard disk, such as a disk of one of the memories 222 and/or storage devices 228 described with reference to FIGS. 2A-2B. Physical and/or virtual elements in a virtualization environment 300 can communicate with physical disk(s) 304 to store and/or retrieve data. Physical device(s) 306 can include one or more virtual devices included in virtualization environment 300 and/or external physical devices that can communicate with virtualization environment 300. A physical device can be any device, such as a network interface card, a video card, a keyboard, a pointing device, an input device, a physical monitor, a speaker, an optical drive, a storage device, a USB connection, a printer, a scanner, any device connected to virtualization environment 300, or any device communicating with virtualization environment 300. A pointing device can be, for example, a mouse, stylus, trackball, joystick, pointing stick, human finger, any input device disclosed with reference to computing system 200, or any other input interface that can allow a user to input spatial data to a computing device. In some embodiments, physical processor(s) 308 can include one or more CPUs 221 and/or GPUs 225.

Virtualization environment 300 can include one or more memories 312. A memory 312 can include any type of memory that can store data, programs, firmware, and/or executable instructions. In some embodiments, a memory 312 can include one or more memories 222. Programs, firmware, and/or executable instructions stored in one or more memories 312 can be executed by one or more physical processors 308 of virtualization environment 300. One or more graphic memories 314 can include any memory accessible by physical processor(s) 308, including local memory, system memory, on-chip memory, and hard disks. In some embodiments, a graphic memory 314 can include one or more graphic memories 226. Physical processor(s) 308 can cause certain graphics corresponding to graphical data stored in one or more graphic memories 314 to be displayed on a physical monitor (e.g., one of physical device(s) 306, which can correspond to a physical monitor 224).

Virtualization environment 300 can further include an operating system 318 that can be stored in one or more memories 312 and executed by one or more physical processors 308. Operating system 318 can also be referred to as a kernel. Moreover, virtualization environment 300 can include a hypervisor 302. Hypervisor 302 can be a program executed by physical processor(s) 308 in virtualization environment 300 to manage any number of virtual machines. In some embodiments, hypervisor 302 can be any combination of executable instructions and/or hardware that monitors virtual machines executing on a computer system 200, such as a server 122. Hypervisor 302 can be stored in one or more memories 312.

Hypervisor 302 can allocate physical resources from a hardware layer 310 and/or virtual resources to one or more virtual machines, e.g., virtual machines 332A-C. A virtual machine can be a software-based emulation of a physical machine, such as a computer system 200. A virtual machine 332A-C can further include a software-based emulation of the execution of software programs on such a physical machine. For example, a virtual machine can emulate the execution of an operating system and/or application on a particularly configured physical machine. Accordingly, a virtual machine can have a virtual operating system (OS) (e.g., OS 330A for virtual machine 332A, OS 330B for virtual machine 332B, and OS 330C for virtual machine 332C). A virtual machine 332A-C can have access to the host computer system's hardware resources through hypervisor 302, which either runs directly on the host computer's hardware (i.e., a bare metal hypervisor) or runs within the host computer's operating system (i.e., a hosted hypervisor).

In some embodiments, hypervisor 302 can provide physical and/or virtual resources to operating systems 330A-C in any manner such that hypervisor 302 simulates any desirable operating system (e.g., Windows, Linux, Unix) to execute on virtual machines 332A-C. The system resources can include, for example, resources from hardware layer 310 and/or any other component included in virtualization environment 300. In these embodiments, hypervisor 302 can be used to partition physical hardware, emulate physical hardware, and/or execute virtual machines that provide users accessing virtualization environment 300 with various computing environments. In some embodiments, hypervisor 302 can control processor scheduling and memory partitioning for virtual machine(s) 332A-C executing in virtualization environment 300.

In some embodiments, hypervisor 302 can create virtual machines 332A-C, in which virtual operating systems 330A-C execute. As an example, hypervisor 302 can load a virtual machine image to create a virtual machine 332A-C. As another example, hypervisor 302 can execute virtual operating systems 330A-C within virtual machines 332A-C, respectively. Operating systems 330A-C are further described in detail below.

In some embodiments, hypervisor 302 of virtualization environment 300 can be a bare metal hypervisor, or a hypervisor that has direct access to applications and processes executing in the host computing system, resources on the host computing system, and hardware on the host computing system (e.g., hardware layer 310 shown in FIG. 3) or communicating with the host computing system. In some embodiments, a bare metal hypervisor can directly access all system resources. For example, if hypervisor 302 is a bare metal hypervisor, it can execute directly on one or more physical processors 308, and can retrieve data stored in one or more memories 312 and/or one or more graphic memories 314. By contrast, a host hypervisor accesses system resources through a host operating system (e.g., operating system 318).

In a virtualization environment that employs a bare metal hypervisor configuration, the host operating system (e.g., operating system 318) can be executed by one or more virtual machines 332. Thus, a user accessing virtualization environment 300 can designate one or more virtual machines 332 as a virtual machine for imitating the host operating system and allowing the user to interact with the virtual machine in substantially the same manner that the user would interact with the host computing system via host operating system 318.

Virtualization environment 300 can host or execute one or more virtual machines 332A-C. In some embodiments, a virtual machine 332A-C can be created for each user accessing virtualization environment 300, for each user requesting a virtual machine 332A-C, and/or for each user requesting a virtual desktop 340A-C. A virtual machine 332A-C can be a set of executable instructions that, when executed by physical processor(s) 308, imitate the operation of a physical computing device such that programs and processes can be executed on a virtual machine 332A-C in a manner similar to that on a physical computing device. It is appreciated that virtualization environment 300 can host any number of virtual machines 332A-C. In some embodiments, one or more virtual machines 332A-C can be provided, such as by hypervisor 302, with a unique virtual view of the physical hardware, memory, processor, and other system resources available to that virtual machine 332A-C (e.g., virtual disk 326A-C and/or virtual processor 328A-C). The unique virtual view can be based on, for example, virtual machine permissions, application of a policy engine to one or more virtual machine identifiers, the user accessing a virtual machine, the applications executing on a virtual machine, networks accessed by a virtual machine, or any other desired criteria. In some embodiments, a virtual machine 332A-C can be provided with a virtual view of resources that are substantially similar to the physical hardware, memory, processor, and/or other system resources available to the virtual machine 332A-C.

As shown in FIG. 3, virtual machines 332A-C can include one or more virtual disks 326A-C. Virtual disks 326A-C can correspond to, for example, one or more physical disks or one or more portions of a physical disk (e.g., physical disk(s) 304). As an example, virtual disk 326A can be allocated a first portion of physical disk(s) 304, virtual disk 326B can be allocated a second portion of physical disk(s) 304, and virtual disk 326C can be allocated a third portion of physical disk(s) 304. In some embodiments, one or more of virtual disks 326A-C can include one or more virtual disk partitions and/or file system(s), similar to those of a physical disk. For example, virtual disk 326A can include a virtual system disk, which includes virtual disk partitions and system files associated with virtual machine 332A. In some embodiments, the virtual system disk can be shared among virtual machines. For example, virtual machines 332B and 332C can have the same or similar system disk as virtual machine 332A.

The virtual file systems of virtual disks 326A-C can also include virtual files and/or folders. For example, virtual disk 326A can also include a virtual user disk, which can store user data such as user files and/or folders. In some embodiments, system and/or user data stored on a virtual system and/or user disk can be synchronized with disks stored in a server (e.g., server 122). The synchronization of a virtual system and/or a user disk between a virtual disk 326 and a server 122 can performed, for example, to save data from the virtual system and/or user disk. In some embodiments, a virtual disk can also include a local disk. The local disk can store data associated with a virtual machine (e.g., virtual machine 332A-C) in persistent storage, such as in one or more physical disks 304 and/or memories 312.

In some embodiments, virtualization environment 300 can also include virtual apertures (not shown) in a virtual memory space, which can be a view of the virtual memory available to virtual machines 332A-C. The virtual apertures can correspond to, for example, physical caches, buffers, and/or memories, such as one or more memories 312, graphic memories 314, and/or internal or external physical disks such as hard disk(s) 304. As an example, under the circumstances that applications running on a virtual machine 332A-C do not require more memory than that which is available in one or more memories 312, the virtual apertures of a virtual machine 332A-C can correspond to a portion of one or more memories 312. As another example, under the circumstances that applications executed by a virtual machine 332A-C require more memory than that which is available in one or more memories 312, the virtual apertures of a virtual machine 332A-C can correspond to one or more portions of one or more memories 312, graphic memories 314, and/or physical disks 304. The virtual apertures can be generated, provided, and/or managed by hypervisor 302.

Virtual processors 328A-C can be virtualized views of one or more physical processors 308 of virtualization environment 300. In some embodiments, a virtualized view of physical processor(s) 308 can be generated, provided, and/or managed by hypervisor 302. In some embodiments, virtual processor(s) 328A-C can have substantially the same characteristics as those of physical processor(s) 308. In some embodiments, virtual processor(s) 328A-C can provide a modified view of physical processor(s) 308, such that at least some of the characteristics of virtual processor(s) 328A-C are different from the characteristics of corresponding physical processor(s) 308.

As shown in FIG. 3, a virtual operating system 330A-C can provide a user of a virtual machine 332A-C with a virtual desktop 340A-C corresponding to the virtual operating system 330A-C being executed on the virtual machine. For example, if a virtual machine 332A executes a virtual operating system 330A that is a virtualization of a Windows™ 7 operating system, virtual desktop 340A can be a virtualization of a desktop environment that is displayed to a user using a Windows™ 7 operating system. A user of a client device 102A-F can interact with a virtual desktop of virtualization environment 300 to interact with virtual programs, applications, files, and/or other computing resources, similar to the way a user would interact with these resources on a physical computing device.

A client device 102A-F can communicate with server(s) 122 of data center(s) 120 using a remote display protocol to access a virtualization environment 300. For example, a client application installed on a client device 102A-F can allow the client device to communicate with a virtualization environment 300 through a communications protocol, such as independent computing architecture (ICA) protocol. This can allow a user to access resources within a virtualization environment 300. Such resources can include programs, applications, files, executable instruction codes, desktop environments 340A-C, computing environments, and/or other resources made available to users of virtualization environment 300.

In some embodiments, virtualization environment 300 can be implemented on one or more servers 122. A client device 102A-F accessing virtualization environment 300 can send input/output information corresponding to a user's interactions with a virtual desktop, and the client device can receive display information from virtualization environment 300 corresponding to the interactions. In some embodiments, all applications and data implemented by the virtual machine remain in a data center 120, with only display, keyboard, and mouse information being communicated between a client device 102A-F and data center(s) 120. For example, a user can select to open a Microsoft Word application from a virtual desktop, and keyboard and/or mouse commands can be transmitted from a client device 102A-F of the user to data center(s) 120. Data center(s) 120 can open a virtualized version of Microsoft™ Word in a virtualized desktop 332A in a virtualization environment 300, and can send an image frame of the virtual desktop with Microsoft™ Word opened to the client device for display. In this way, information regarding client interactions is transmitted from a client device 102A-F to a virtualization environment, software is executed in virtualization environment to implement changes to a virtual desktop, and updated image frames are transmitted to the client device to display the changes to the virtual desktop. Alternatively, the client application can be configured to execute a portion of the virtualization environment 300 on the client device, so that some of the software associated with the virtualization environment 300 is executed at the client device, and other software associated with the virtualization environment 300 is executed at one or more data centers. In some embodiments, virtualization environment 300 is implemented on a client device 102A-F, and a virtual desktop can be displayed to a user of the client device without having to communicate with another device over a network.

A virtualization environment 300 can support a number of client devices 102A-F. In some embodiments, each user requesting access to virtualization environment 300 can be provided their own virtual machine 330A-C. For example, a first user of a client device 102A can request a virtualized Windows™ 7 computing environment, and can be provided with virtual machine 332A implementing a virtual Windows™ 7 operating system. A second user of a client device 1021B can request a virtualized Linux computing environment, and can be provided with a virtual machine 332B implementing a virtual Linux operating system at the same time as virtual machine 332A is being provided to the first user. And although three virtual machines 332A-C are illustrated in exemplary virtualization environment 300 of FIG. 3, the disclosure is not so limited. Virtualization environment 300 can provide any number of virtual machines to any number of client devices 102A-F. In some embodiments, each client device 102A-F requesting access to virtualization environment 300 can be provided with its own virtual machine 332A. In some other embodiments, a plurality of client devices 102A-F can share a virtual machine. One or more computer systems 200 implementing a virtualization environment 300 can dynamically allocate virtual machines as requested by client devices. That is, when a user has stopped using a virtual machine, computing system(s) 200 can close the virtual machine and reallocate the computing resources being utilized for that virtual machine, so that the resources can be used for other purposes (e.g., for other virtual machines).

Virtualization environment 300 can also determine characteristics of one or more physical monitors 224 connected to a client device 102A-F accessing virtualization environment 300, and can generate one or more virtual monitors 350A-C that virtualize the display of a desktop 340A-C on a physical monitor having those characteristics. The characteristics can include, for example, an aspect ratio, resolution, size, dimension, type, refresh rate, number of pixels, supported video format, or contrast of a physical monitor 224 connected to a client device 102A-F. For example, virtualization environment 300 can identify a client device 102C accessing virtualization environment 300 as having a touch sensitive tablet display of a certain resolution, such as 1024×768 pixels. Virtualization environment 300 can provide client device 102C with virtual desktop 340A of a virtual machine 332A running a virtual operating system 330A, and create one or more virtual monitors 350A corresponding to the characteristics of the monitor 224 of client device 102C. Images of virtual desktop 340A can then be provided to client device 102C using virtual monitors 350A, so that the images are captured with characteristics that correspond to the characteristics of a physical monitor 224 connected to client device 102C. For example, a virtual monitor 350A can be created with a 1024×768 pixel resolution, so that images of virtual desktop 340B are captured and provided to client device 102C with the same resolution as a physical monitor 224 connected to client device 102C. Accordingly, virtualization environment 300 can provide a plurality of different virtual desktops 340A-C in a plurality of different virtual monitors 350A-C to a plurality of different client devices 102A-F having different types of physical monitors 224. In some embodiments, virtual monitor(s) 350A-C may not necessarily correspond to physical monitors. For example, a user of a client device 102A-F accessing virtualization environment 300 can select any desired monitor characteristics for the one or more virtual monitors provided for the user's virtual machine. Alternatively, virtualization environment 300 can be preconfigured to create virtual monitors 350A-C having certain characteristics.

Figure 4:
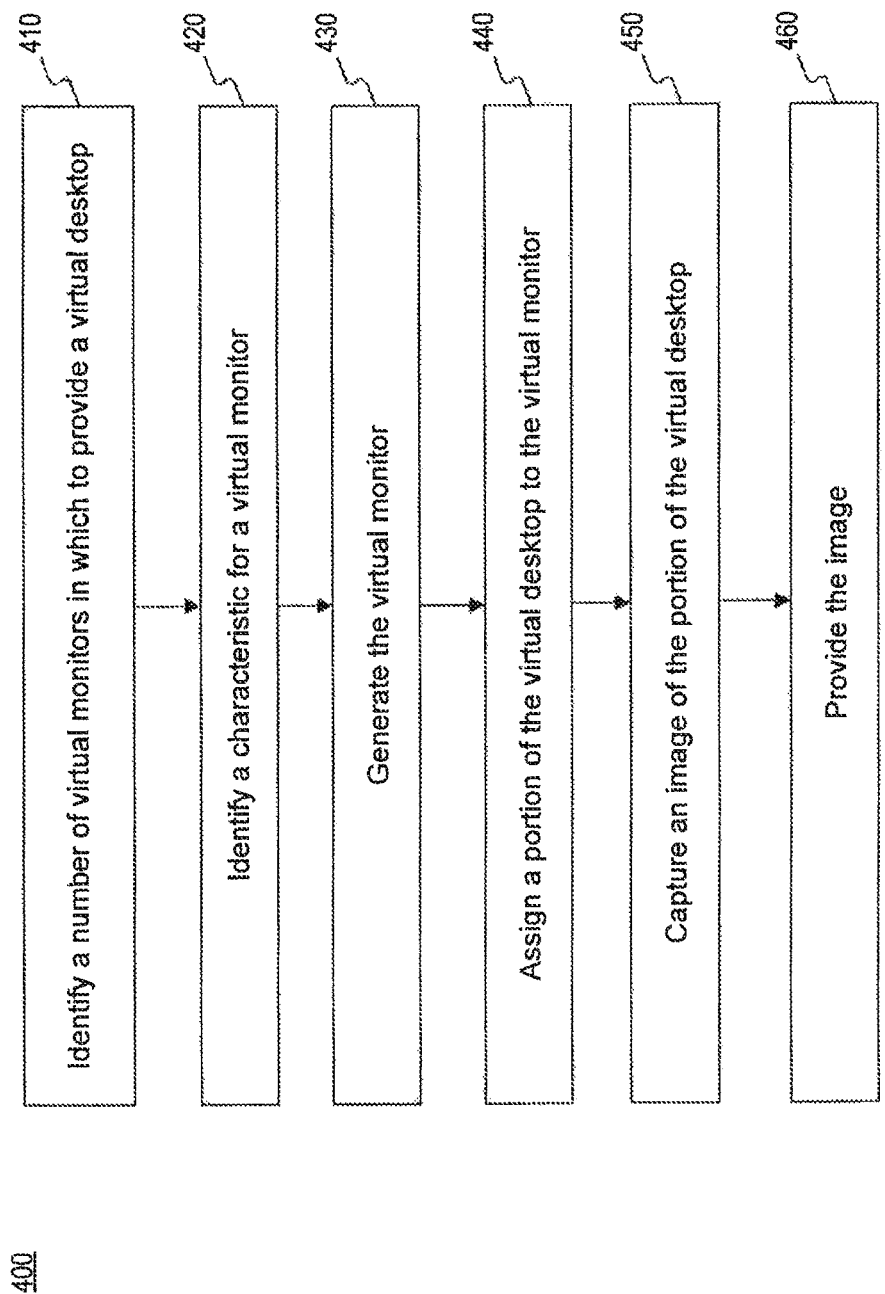
FIG. 4 is a flowchart illustrating an exemplary method for providing virtual monitors, consistent with embodiments of the present disclosure.

FIG. 4 illustrates a flowchart of an exemplary method 400, consistent with embodiments of the present disclosure. Exemplary method 400 can be implemented in a computing environment (see, e.g., FIG. 1) using one or more computing systems (see, e.g., FIGS. 2A-B). In some embodiments, method 400 can be performed by one or more servers (e.g., one or more servers 122) implementing a virtualization environment (e.g., virtualization environment 300). In some other embodiments, method 400 can be performed by a client device (e.g., client device 102A-F) implementing a virtualization environment (e.g., virtualization environment 300). It will be readily appreciated that the illustrated procedure can be altered to modify steps, delete steps, and/or include additional steps.

As further discussed below, method 400 can be initiated in a number of different scenarios. In some embodiments, method 400 can begin after a user has selected to connect to a virtual desktop. In some other embodiments, method 400 can begin when a user interacting with a virtual desktop requests to change the number of virtual monitors being used. In some further embodiments, method 400 can begin when a user interacting with a virtual desktop requests to change a characteristic of one or more of the virtual monitors being used. In still some further embodiments, method 400 can begin when a user interacting with a first application in a virtual desktop selects to open a second application. It will be readily appreciated that method 400 can begin based on other user interactions and/or settings within a virtualization environment.

In step 410, a number of virtual monitors in which to display a virtual desktop can be identified. In some embodiments, the number of virtual monitors can be identified based on a user selection. For example, a user interface screen, such as exemplary user interface screen 505 illustrated in FIG. 5A, can be presented on the client device prompting a user to select a number of virtual monitors in which the user wishes a virtual desktop to be presented. The user interface screen can include one or more graphical elements that allow the user to specify a number of virtual monitors in which to present the desktop. It will be appreciated that screen 505 of FIG. 5A is presented only for purposes of illustration, and that the number of virtual monitors could be selected using any graphical element known in the art.

After being selected, the number of virtual monitors can be communicated to computer system(s) 200 implementing a virtualization environment 300. In some embodiments, the number of virtual monitors in which to display a virtual desktop can be preconfigured within the virtualization environment. For example, the number of virtual monitors to use for a particular virtual desktop can be preconfigured by a network administrator, or can be preconfigured as a preference of a particular user. In some embodiments where a user is already interacting with a virtual desktop, a number of virtual monitors in which the virtual desktop is displayed can be changed based on some event. For example, a number of virtual monitors in which the virtual desktop is displayed can be increased if a user selects to open a new application, as discussed in greater detail below. After the number of virtual monitors in which to present the virtual desktop has been identified, method 400 can proceed to step 420.

In step 420, a characteristic for one or more of the virtual monitors can be identified. A characteristic can correspond to a characteristic of a physical monitor, and include, for example, an aspect ratio, resolution, size, dimension, type, refresh rate, number of pixels, video format, contrast, brightness, manufacturer, model, serial number, phosphor or filter type, timing, luminance, or any other characteristic of a physical display device. Any combination of one or more characteristics can be identified.

In some embodiments, the characteristic can be a characteristic of a physical monitor connected to the client device. For example, a client can be aware of and/or receive information regarding characteristics of a connected physical monitor, such as extended display identification data (EDID) or DisplayID data. Information regarding one or more characteristics of a physical monitor (e.g., physical monitor 224) at the client device can be sent to computer system(s) providing the virtualization environment. In some embodiments, the client device can be connected to multiple physical monitors (e.g., physical monitors 224), and information regarding characteristics of each of the multiple physical monitors can be sent to computer system(s) providing a virtualization environment 300. In some embodiments, the identified characteristic can be a characteristic of a physical monitor connected to a physical computer located remotely from the client device. For example, if a user selects to connect to a virtual desktop that emulates a desktop of a physical computer (e.g., the user's work computer), one or more characteristics of one or more physical monitors connected to the physical computer can be identified.

Figure 5B:
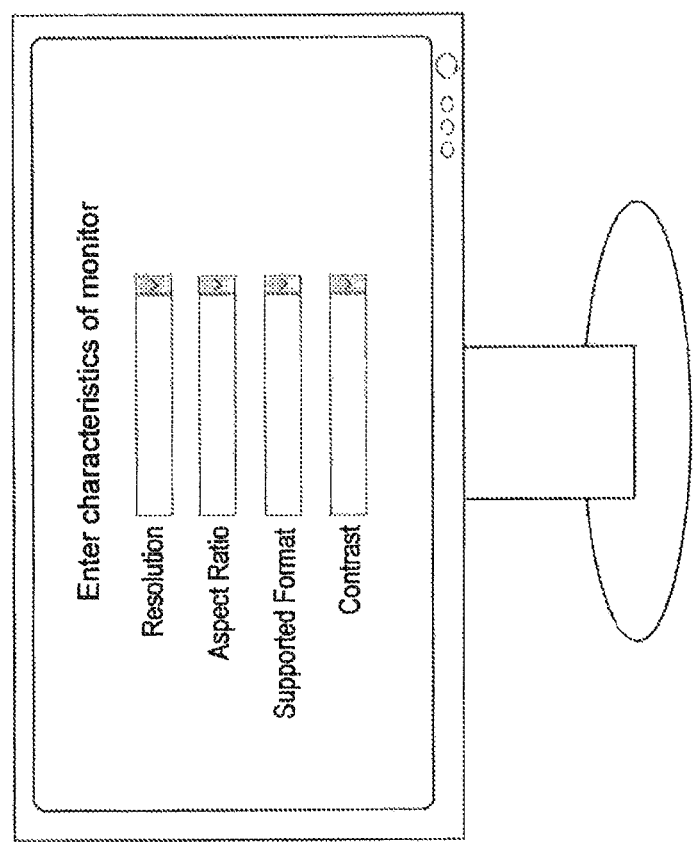
FIG. 5B is an exemplary screen of an exemplary user interface for selecting characteristics of a virtual monitor, consistent with embodiments of the present disclosure.

In some embodiments, a user of the client device can select one or more characteristics for one or more of the virtual monitors through a user interface. For example, a user interface screen, such as exemplary screen 510 of FIG. 5B can be presented, and a user can select one or more characteristics for a virtual monitor from one or more graphical elements displayed in screen 510. It will be appreciated that screen 510 of FIG. 5B is presented only for purposes of illustration, and that any combination of characteristics could be selected using any graphical element known in the art.

In some other embodiments, characteristics for one or more of the virtual monitors can be identified from user preferences stored on the client device or on a server (e.g., server 122), or one or more settings preconfigured by a network administrator. In some embodiments, one or more characteristics can be identified for each of the number of virtual monitors identified in step 410. After the characteristic(s) of the virtual monitor(s) have been identified, method 400 can proceed to step 430.

In step 430, a virtual monitor can be generated. In some embodiments, a virtual monitor can be generated based on the identified characteristic(s) in step 430. For example, if the characteristics identified for a virtual monitor in step 420 included a resolution of 1024×768 pixels and a 16:9 aspect ratio, a virtual monitor with characteristics corresponding to a physical display, having a 1024×768 pixel resolution and a 16:9 aspect ratio can be generated. In some embodiments, a virtual monitor can be generated for each virtual monitor of the number of virtual monitors identified in step 410. In some embodiments, the characteristics identified in step 420 can correspond to characteristics of only one particular physical monitor (e.g., physical monitor 224) connected to the client device. In such embodiments, a virtual monitor can be generated for each of the number of virtual monitors identified in step 410, and each of the generated virtual monitors can have the same characteristics that were identified in step 420. For example, four virtual monitors can be identified in step 410 and characteristics of the physical monitor connected to the client device can be identified in step 420. In such an example, four virtual monitors can be generated, each having characteristics corresponding to the physical monitor connected to the client device. In some other embodiments, different characteristics can be identified for each of the number of virtual monitors, and the number of virtual monitors can be generated to have the differing characteristics.

In some embodiments, a virtual monitor can be generated by allocating a portion of hardware layer resources (e.g., hardware layer resources 310) of the virtualization environment. For example, certain processing and/or storage resources can be allocated to the virtual monitor to allow the virtual monitor to emulate a physical monitor displaying a certain portion of a desktop. In some embodiments, a frame buffer (e.g., frame buffer 316) of a graphic memory (e.g., graphic memory 314) can be allocated for each generated virtual monitor. In some other embodiments, generated virtual monitors can share the frame buffer of the graphic memory. By allocating processing and/or storage resources to a virtual monitor, the virtualization environment can simulate a display of a portion of a desktop on a physical monitor having certain characteristics, and can store images of the display in a frame buffer. The virtualization environment can support the simulation of a plurality of different virtual monitors on a plurality of different virtual machines supporting a plurality of different users, all operating simultaneously.

In some embodiments, a virtual monitor can be generated to simulate multiple virtual monitors. For example, if a resolution of 1024×768 pixels has been identified for two virtual monitors, rather than create the two virtual monitors, virtualization environment can generate a single virtual monitor with a resolution of 2048×768 pixels, and can store information so as to identify one half of the virtual monitor as corresponding to the first requested virtual monitor, and to identify the other half of the virtual monitor as corresponding to the second requested virtual monitor. Doing so can allow a virtualization environment to save resources by, for example, providing only one frame buffer for the single virtual monitor representing the two requested virtual monitors. This can be particularly useful in situations where client devices with small screen sizes, such as mobile phones, request a number of virtual monitors, because a single virtual monitor of a higher resolution can represent many physical monitors for such devices. After a virtual monitor has been generated in step 430, method 400 can proceed to step 440.

Figure 6:
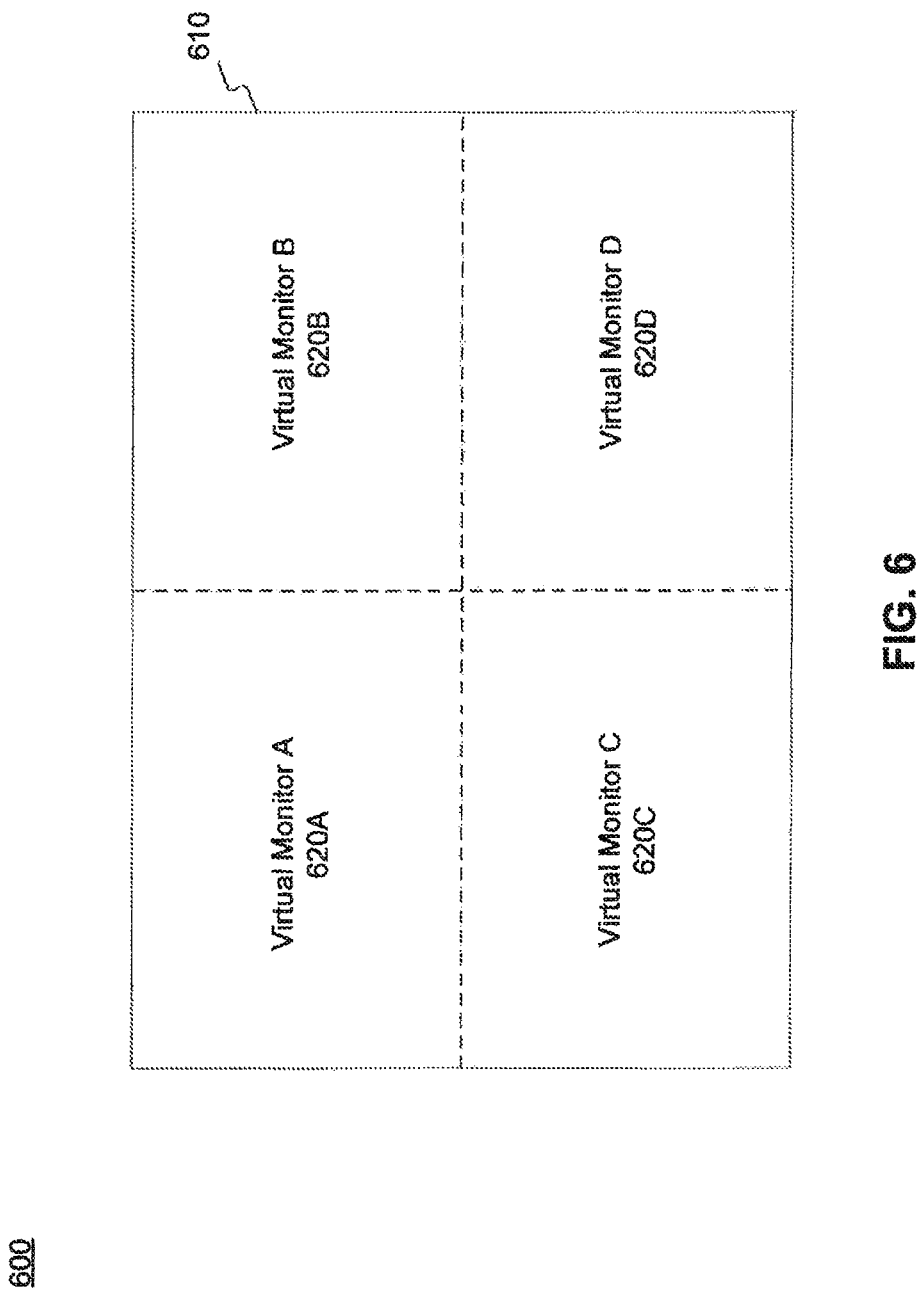
FIG. 6 is a diagram of an exemplary virtual desktop being provided over a number of virtual monitors, consistent with embodiments of the present disclosure.

In step 440, a portion of the virtual desktop can be assigned to the virtual monitor. In some embodiments, the portion of the virtual desktop assigned to a virtual monitor can be determined based on the number of virtual monitors identified in step 410. For example, if the number of virtual monitors identified in step 410 is one, the entire virtual desktop can be assigned to the virtual monitor. In some embodiments, if the number of virtual monitors identified in step 410 is greater than one, the virtual desktop can be divided among the virtual monitors, such that each virtual monitor displays a portion of the virtual desktop, while not displaying another portion of the virtual desktop. FIG. 6 is a diagram 600 of an exemplary virtual desktop 610, and exemplary virtual monitors A-D for displaying the exemplary virtual desktop 610. Diagram 600 can correspond to a situation where four virtual monitors were identified in step 410, and where the same characteristics were identified in step 420 for each of the virtual monitors 620A-D. In such a situation, a virtual desktop, such as virtual desktop 610, can be divided into four equal parts. A virtual monitor A can be assigned to an upper left quadrant 620A of virtual desktop 610, a virtual monitor B can be assigned to an upper right quadrant 620B of virtual desktop 610, a virtual monitor C can be assigned to a lower left quadrant 620C of virtual desktop 610, and a virtual monitor D can be assigned to a lower right quadrant 620D of virtual desktop 610.

Although diagram 600 of FIG. 6 illustrates allocating four different equally sized regions of a rectangular virtual desktop to four different virtual monitors, the disclosure is not so limited. A virtual desktop can have any shape or size, and can be divided into parts based on any identified number of virtual monitors. In some embodiments, portions of a virtual desktop can also be assigned on the basis of characteristics of the virtual monitors identified in step 420. For example, a virtual monitor generated with a higher resolution based on characteristics identified in step 420 can be assigned a larger portion of a virtual desktop than a virtual monitor generated with a lower resolution based on characteristics identified in step 420. In some embodiments, all portions of the virtual desktop can be assigned to virtual monitors in step 440. After the portion of the virtual desktop has been assigned in step 440, method 400 can proceed to step 450.

Figure 7A:
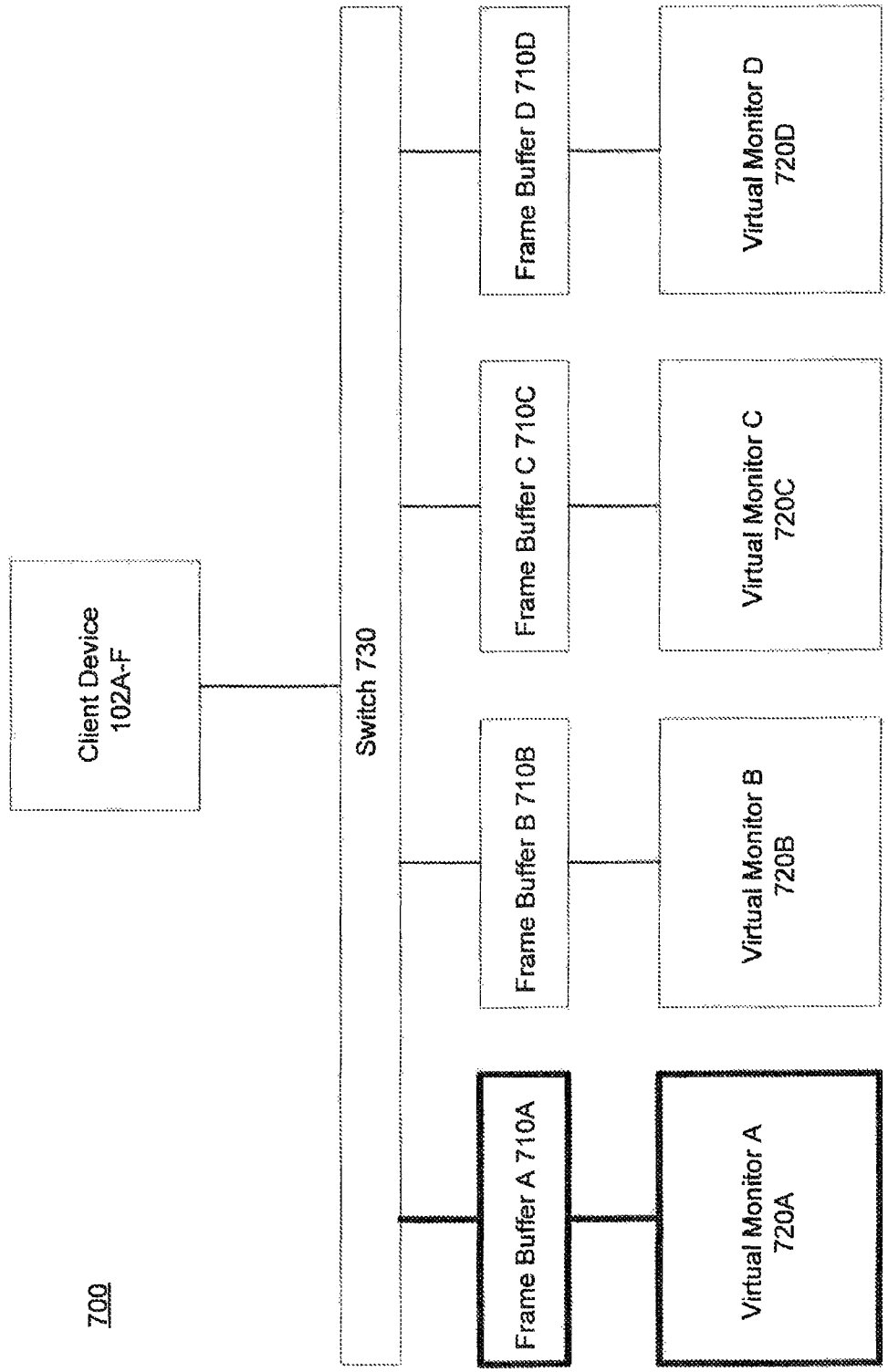
FIG. 7A illustrates an exemplary computing environment for providing images of a virtual monitor, consistent with embodiments of the present disclosure.

In step 450, an image of the portion of the virtual desktop displayed in a virtual monitor can be captured. As noted previously with respect to step 440, each virtual monitor can simulate the rendering of a certain portion of a virtual desktop on a physical monitor having certain characteristics. Each of the virtual monitors can have a frame buffer of the graphic memory allocated to it, or the virtual monitors can share a frame buffer. FIG. 7A illustrates an exemplary computing environment 700 for providing images of the virtual monitors to a client device. For example, in exemplary computing environment 700, each virtual monitor A-D 720A-D has been allocated its own frame buffer A-D) 710A-D, respectively. A frame buffer can capture image data from the renderings of the portions of the virtual desktop on a virtual monitor. For example, a frame buffer can capture an image frame from a virtual monitor at a periodic interval (e.g., 10 ms), and store the image frame in the frame buffer. Alternatively, a frame buffer can capture information representing an image frame. Such information could be any type of information associated with image and/or video compression and known in the art. After an image of the portion of the virtual desktop displayed in a virtual monitor has been captured, method 400 can proceed to step 460.

In step 460, the image can be provided for presenting on a physical monitor of a client device. For example, a user of the client device can select one of the virtual monitors as being active, and images stored in a frame buffer associated with the selected virtual monitor can be provided to the client device. In some embodiments where the client device is remote from the computing system implementing the virtualization environment, the images can be transmitted over one or more networks, such as public network(s) 104 and/or private network(s) 110. Block diagram 700 of FIG. 7A illustrates a situation in which a user has selected to make virtual monitor A 720A active (as indicated by the darkened lines corresponding to virtual monitor A 720A). A switch 730, which can be based in hardware and/or software, can select virtual monitor A 720A and cause images from frame buffer A 710A to be sent to client device 102A-F, such as over one or more networks (e.g., public network(s) 104 and/or private network(s) 110).

Exemplary computing environment 700 of FIG. 7A can correspond to a situation in which a client device (e.g., client device 102A-F) has one physical monitor (e.g., physical monitor 224) connected to it, but has requested four virtual monitors. In such a situation, the physical monitor can only be capable of displaying image data of one virtual monitor at a time. Accordingly, the user can select which virtual monitor that the user wishes to view at any given time. Nevertheless, it will be recognized that a user using a client device (e.g., client device 102A-F) having multiple connected physical monitors can select multiple virtual monitors for viewing simultaneously. For example, a user using a client device (e.g., client device 102A-F) having two connected physical monitors (e.g., physical monitors 224) can select two of the virtual monitors, such as virtual monitor A 720A and virtual monitor B 720B, for viewing simultaneously. In some embodiments, the virtual monitors that are not selected for viewing by a user at a particular time can be in a paused state. These virtual monitors can continue to virtualize the display of a portion of the virtual desktop, and corresponding frame buffers can continue to store updated images of these virtual monitors. However, a computing system (e.g., computing system 200) implementing virtualization environment (e.g., virtualization environment 300) can stop the transmission of images from these virtual monitors until they are again selected by the user. Moreover, the computing system can also save processing and/or memory resources when virtual monitors are in a paused state. For example, frame buffers associated with paused virtual monitors can be updated less frequently with image data, and/or the amount of memory allocated to a paused virtual monitor can be decreased until the virtual monitor is again selected as active.

A user of a client device (e.g., client device 102A-F) viewing one of the virtual monitors can select a different virtual monitor for viewing. For example, a user of a client device (e.g., client device 102A-F) with one physical monitor (e.g., physical monitor 224) viewing virtual monitor A 720A of FIG. 7A can wish to view virtual monitor C 720C. A user can select to switch to virtual monitor C 720C by selecting a graphical element on the physical monitor, such as a graphical element displayed in virtual monitor A 720A. Alternatively, a user can select to switch to virtual monitor C 720C by selecting one or more keys on a user input device, such as a keyboard. For example, a user can enter a shortcut key combination, such as "Alt+S" or "Alt+R" to toggle between virtual monitors. In some embodiments, a graphical element or user input key can be associated with a particular virtual monitor, and selection of that graphical element or user input key can cause the virtualization environment 300 to switch to the corresponding virtual monitor. In some embodiments, a graphical element or user input key may not be associated with a particular virtual monitor, and selection of the graphical element or user input key will instead toggle through each of the virtual monitors, displaying each in turn. For example, a user viewing virtual monitor A 720A of FIG. 7A can select a graphical element or press a button to toggle from virtual monitor A 720A to virtual monitor B 720B. If the user is not interested in virtual monitor B 720B, the user can again select the graphical element or press the key to toggle virtual monitor B 720B to virtual monitor C 720C of FIG. 7A. Alternatively, virtualization environment 300 can automatically toggle between the virtual monitors in response to a selection of a graphical element or key, and can cycle through the virtual monitors, displaying each for a period of time until the next virtual monitor is displayed. When the virtual monitor that the user is interested in is displayed, the user can select a graphical element or key to stop the toggling and stay on that virtual monitor. In some embodiments, a user interface screen with selectable icons corresponding to each of the virtual monitors can be displayed in response to a selection of a graphical element or key, and can allow the user to designate the desired virtual monitor by selecting an icon corresponding to the desired virtual monitor.

Figure 7B:
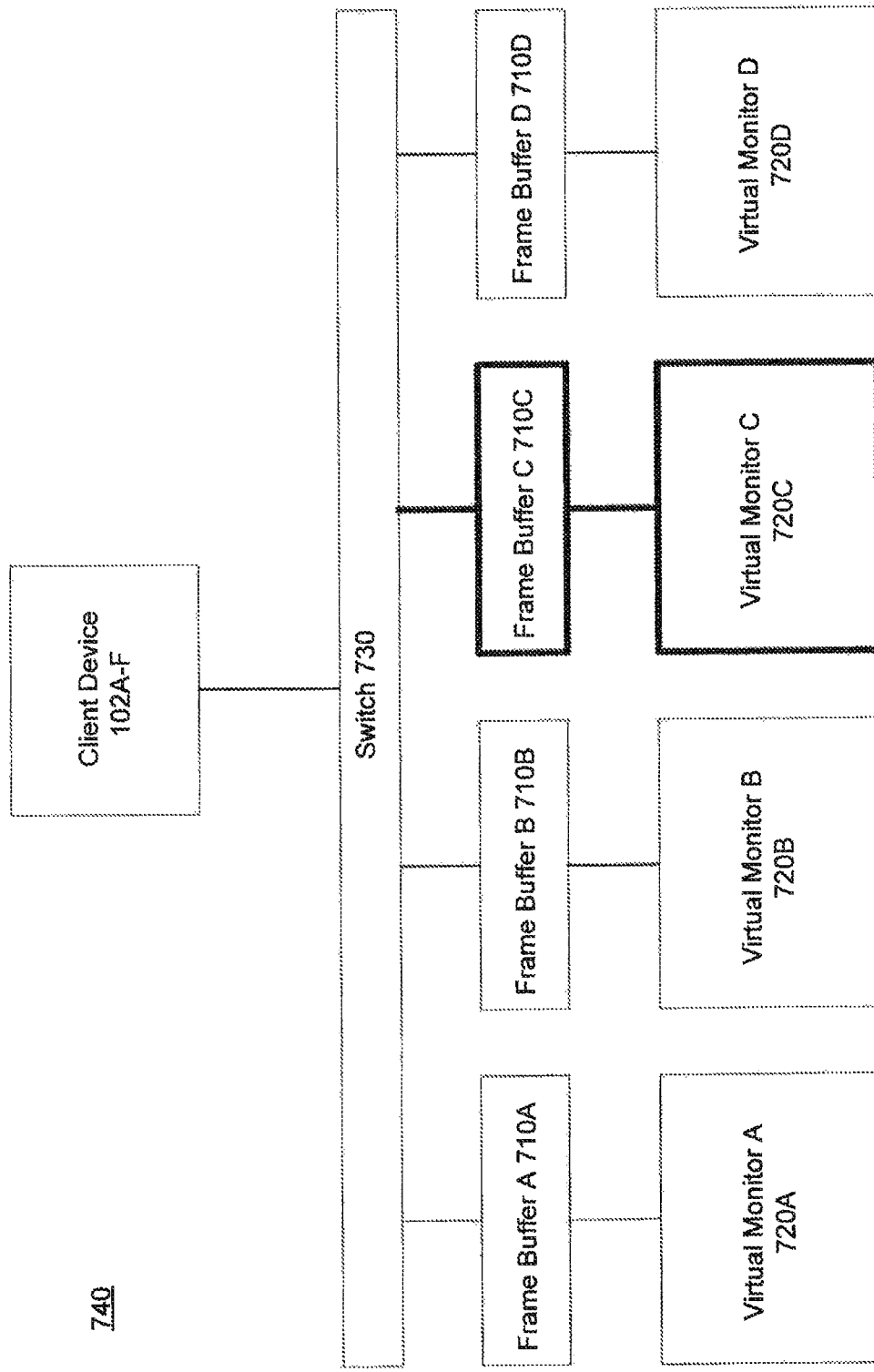
FIG. 7B illustrates an exemplary computing environment for providing images of another virtual monitor, consistent with embodiments of the present disclosure.

FIG. 7B illustrates exemplary computing environment 700 after a user viewing virtual monitor A 720A has selected to switch to virtual monitor C 720C. As illustrated in FIG. 7B, after the user selects to switch to virtual monitor C 720C, switch 730 switches to frame buffer C 710C and images from virtual monitor C 720C are sent to client device 102A-F. This is illustrated by the darkened lines associated with frame buffer C 710C and virtual monitor C 720C in FIG. 7B. As further illustrated in FIG. 7B, virtual monitor A 720A is paused in response to the user selection to switch to virtual monitor C 720C. This is illustrated in FIG. 7B by the fact that frame buffer A 710A and virtual monitor A 720A are no longer illustrated by darkened lines.

Figure 8B:
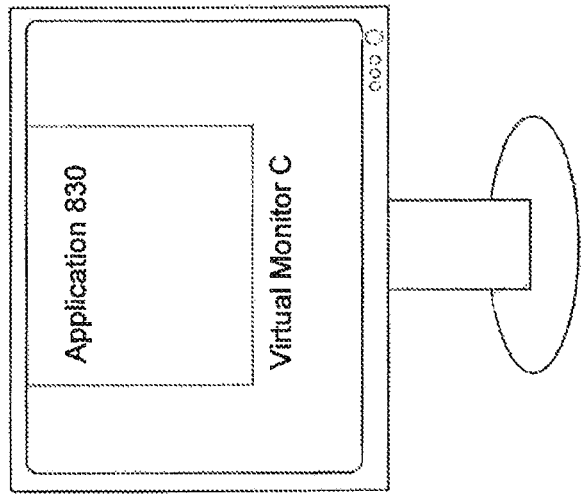
FIG. 8B illustrates an exemplary computing environment for displaying images of another virtual monitor, consistent with embodiments of the present disclosure.
Figure 8A:
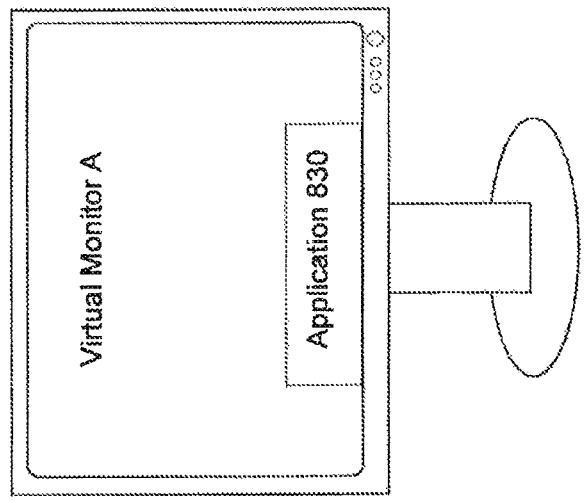
FIG. 8A illustrates an exemplary computing environment for displaying images of a virtual monitor, consistent with embodiments of the present disclosure.

FIGS. 8A-B illustrates views of virtual monitors on a physical monitor (e.g. physical monitor 224) of a client device, corresponding to computing environment 700 of FIGS. 7A-B. For example, client environment 810 of FIG. 8A can correspond to the display of virtual monitor A 720A. As shown in the example of FIG. 8A, the physical monitor displays virtual monitor A, which can include a portion of the virtual desktop including a top portion of an application 830. After the user has selected to switch to virtual monitor C, such as in the example of FIG. 7B, the physical monitor can display a different portion of the virtual desktop corresponding to virtual monitor C, including a bottom portion of application 830.

Figure 9B:
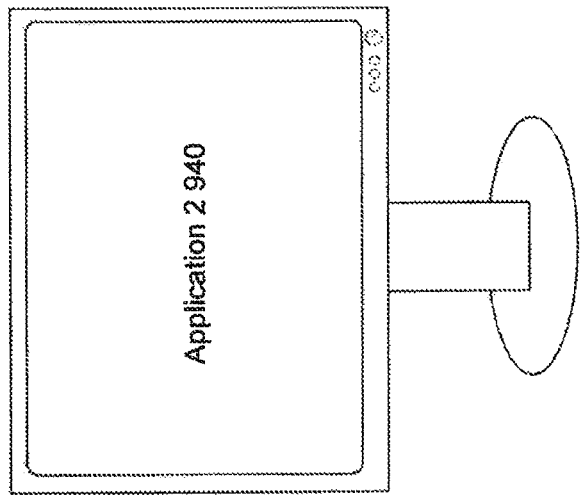
FIG. 9B illustrates another exemplary computing environment for displaying images of another virtual monitor, consistent with embodiments of the present disclosure.
Figure 9A:
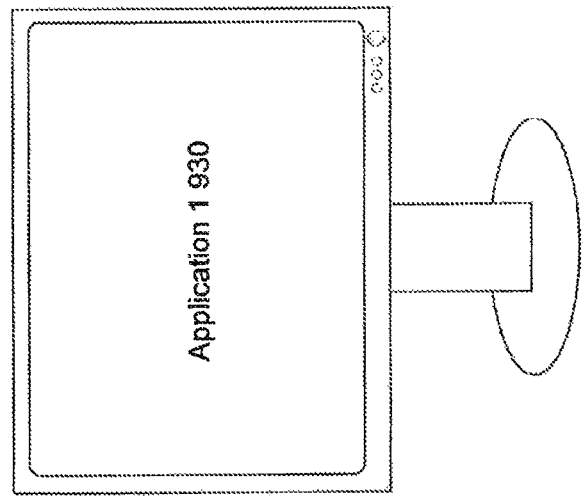
FIG. 9A illustrates another exemplary computing environment for displaying images of a virtual monitor, consistent with embodiments of the present disclosure.

FIGS. 9A-B illustrates additional views of virtual monitors on a physical monitor (e.g. physical monitor 224) of a client device, corresponding to computing environment 700 of FIGS. 7A-B. For example, client environment 910 of FIG. 9A can correspond to the display of virtual monitor A 720A. As shown in the example of FIG. 9A, the physical monitor displays virtual monitor A, which can include a portion of the virtual desktop including a first application (e.g., application 1 930) displayed in full screen. Full screen display can correspond to a display mode in which an application is displayed so as to fill the entire virtual monitor. Alternatively, full screen display can correspond to a display mode in which an application is displayed at its maximum size within a virtual monitor. For example, an application that has a maximum resolution that is less than the resolution of a virtual monitor can have a maximum size that is smaller than that of the virtual monitor. After the user has selected to switch to virtual monitor C, such as in the example of FIG. 7B, the physical monitor can display a different portion of the virtual desktop corresponding to virtual monitor C, including a second application (e.g., application 2 940). In some embodiments, the second application may be displayed in full screen mode.

Figure 10:
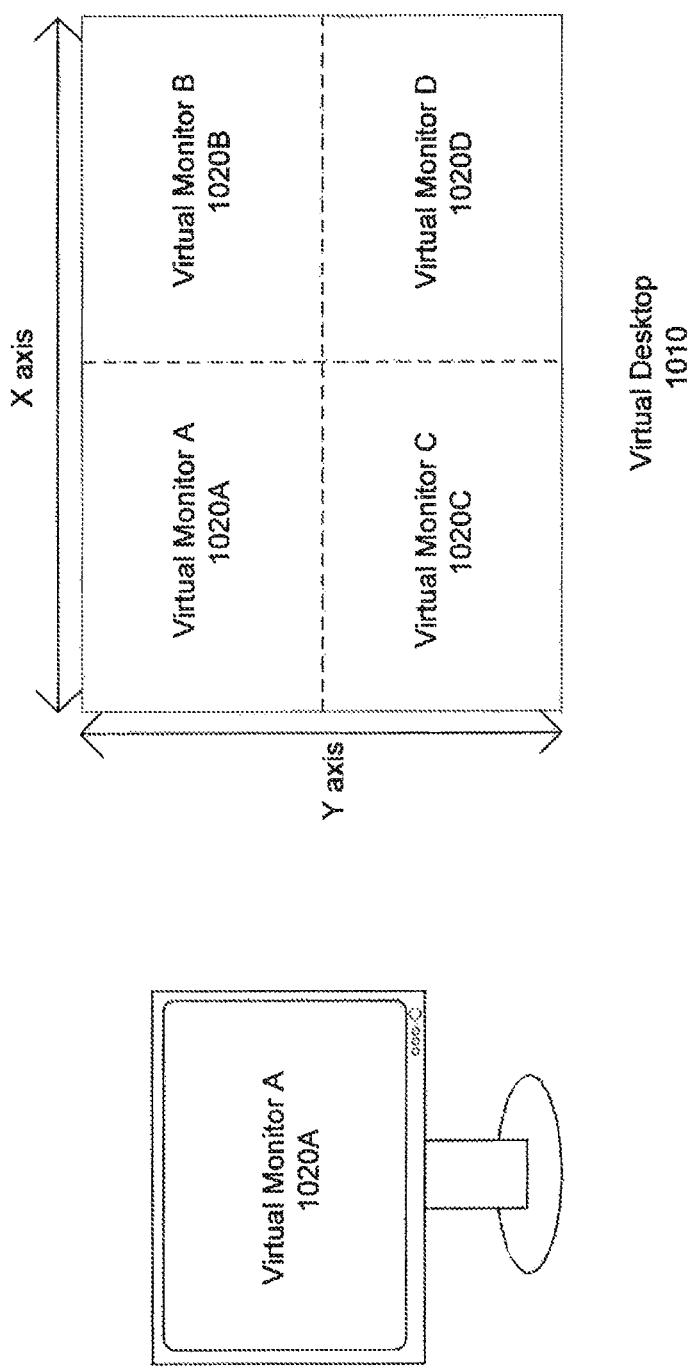
FIG. 10 illustrates an exemplary coordinate system of a virtual desktop being displayed on a physical monitor.

In some embodiments, user input devices associated with a client device 102A-F may need to be mapped to the different virtual monitors when they are selected for display. For example, a virtual desktop, such as virtual desktop 1010 of FIG. 10, can have a coordinate plane that is greater in size than the coordinate plane of a single virtual monitor that can be displayed on a physical monitor (e.g., physical monitor 224) of a client device (e.g., client device 102A-F). In the example of FIG. 10, the physical monitor is only displaying the portion of virtual desktop 1010 provided in virtual monitor A 1020A. A pointer, such as a mouse, can be displayed at a particular X, Y position in virtual monitor A 1020A on the physical monitor. In some embodiments, when a user selects to switch to a different virtual monitor, X, Y coordinates of the position of the pointer on the physical monitor can be transmitted to the computer system (e.g., computer system 200) implementing a virtualization environment (e.g., virtualization environment 300). The virtualization environment can then map the X, Y coordinates of the position of the pointer on the physical monitor to X, Y coordinates in the selected virtual monitor. For example, the virtualization environment can consult a conversion table or list to convert the coordinates. An exemplary conversion table 1100 corresponding to virtual desktop 1010 of FIG. 10 is illustrated in FIG. 11. The conversion table can list information for converting the coordinates of the physical monitor of FIG. 10 to coordinates of a virtual monitor. For example, conversion table 1100 indicates that the X coordinates in a virtual monitor A 1020A (e.g., $X_1$) are the same as the X coordinates in the physical monitor (e.g., $X_1$), and that the Y coordinates in a virtual monitor A 1020A correspond to the Y coordinates in the physical monitor (e.g., Yd plus some amount $Y_N$. The additional amount $Y_N$ can depend on characteristics of virtual monitor A 1020A, such as a size and/or resolution of virtual monitor A 1020A. Similar conversions are listed in exemplary table 1100 for virtual monitors B-D 1020B-D. It will be appreciated that conversion table 1100 is provided only for purposes of illustration, and that the conversion values in a conversion table can vary depending on the characteristics of the virtual monitors and/or the number of virtual monitors. Additionally, it will be appreciated that conversion table 1100 can provide conversion values for converting multiple physical monitors to virtual monitor coordinates, such as in a situation where multiple physical monitors are attached to the client device.

As was described previously, method 400 of FIG. 4 can be initiated under a variety of different situations. In some embodiments step 410 can occur after a request for the virtual desktop is received. For example, a client device (e.g., client device 102A-F) can use a protocol (e.g., ICA) to establish a connection with one or more computer systems (e.g., computer systems 200, such as servers 122) that provide a virtualization environment (e.g., virtualization environment 300). In some embodiments, client software can be installed on the client device that allows the client device to establish the connection using the protocol. In some embodiments, the request for the virtual desktop can be received as part of establishing the connection with the computer system providing the virtualization environment. In some other embodiments, the request can be received after a user has made a selection on the client device. For example, after a connection is established with the computer system providing the virtualization environment, a user interface screen, such as exemplary screen 1205 of FIG. 12A, can be displayed to the user of the client device.

Figure 12A:
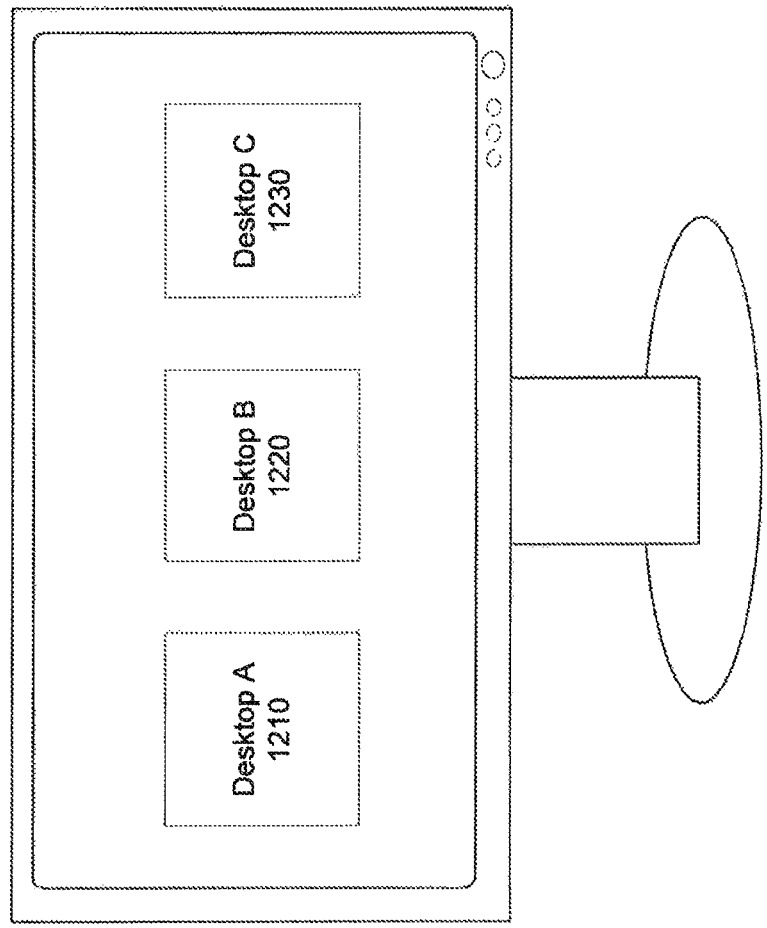
FIG. 12A illustrates an exemplary screen of an exemplary user interface for selecting a virtual desktop.

Exemplary screen 1205 illustrates a number of selectable graphical user interface elements (e.g., icons) 1210, 1220, 1230 corresponding to virtual desktops from which a user can select. The virtual desktops from which a user can select can correspond to the different virtual desktops 340A-C of the different virtual operating systems 330A-C provided by virtual machines 332A-C of a virtualization environment (e.g., virtualization environment 300). For example, desktop A 1210 could correspond to a Windows™ Vista desktop, desktop B 1220 could correspond to a Windows™ 7 desktop, and desktop C 1230 could correspond to a Linux desktop. In some embodiments, a virtual desktop can be a virtualization of a particular desktop environment on a physical computer located remotely from a client device (e.g., client device 102A-F), such as a virtualization of an employee's work computer. For example, an employee can use the client device at home to access a virtual desktop of his/her work computer located in an office building. Although three different virtual desktops are illustrated in FIG. 12A, the disclosure is not so limited. A user can select from any number (e.g., one or more) of virtual desktops. In some embodiments, the virtualization environment can be provided locally on the client device, and the request can be received locally based on a user selection of a desired virtual desktop. Once a virtual desktop has been selected, steps 410 and 420 can be performed as described previously. For example, a user could select a number of virtual monitors and characteristics of the virtual monitors using user interface screens, such as user interface screens 505 and 510 of FIGS. 5A and 5B, respectively.

Figure 12B:
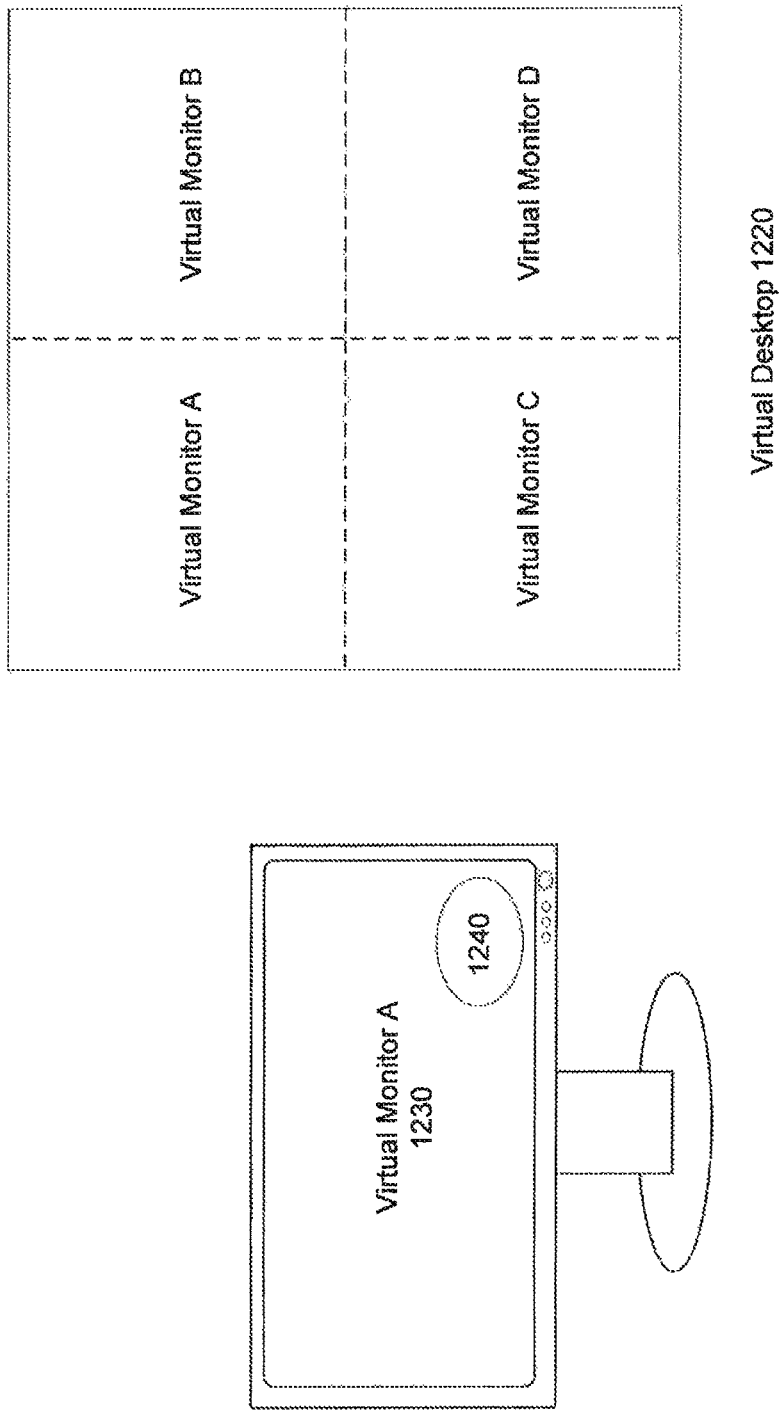
FIG. 12B illustrates an exemplary screen of an exemplary user interface for selecting to change a number and/or characteristic of a virtual desktop.

In some embodiments, method 400 of FIG. 4 can be initiated when a user is interacting with a virtual desktop in a virtual monitor. For example, a user can be interacting with a virtual desktop in a virtual monitor, such as virtual desktop 1220 in a virtual monitor 1230 of FIG. 12B, and can select a graphical element, such as graphical element 1240, to create one or more additional virtual monitors and/or to change characteristics of one or more existing virtual monitors. A user could then select a number of virtual monitors and/or characteristics of the virtual monitors using user interface screens, such as user interface screen 505 of FIG. 5A and/or user interface screen 510 of FIG. 5B. Based on the selected values, the virtual desktop could then be reapportioned across the newly selected virtual monitors and/or across virtual monitors having changed characteristics. For example, if the user had previously been interacting with a virtual desktop in two virtual monitors, and selected to create two additional virtual monitors, the virtual desktop can be increased in size across the four virtual monitors.

Figure 12C:
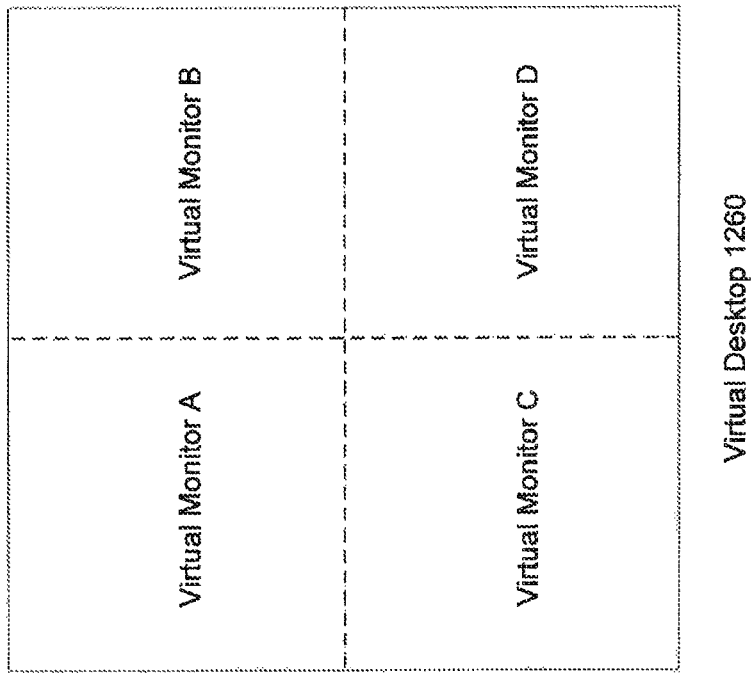
FIG. 12C illustrates an exemplary screen of an exemplary user interface for selecting to open a second application in a virtual desktop.
Figure 12C:
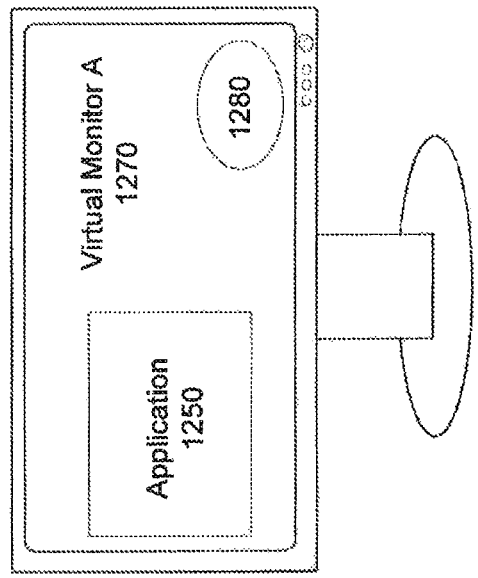

In some embodiments, method 400 of FIG. 4 can be initiated when a user is interacting with a first application in a virtual desktop in a virtual monitor, such as first application 1250 in virtual desktop 1260 in virtual monitor 1270 of FIG. 12C, and selects a graphical element 1280 to open a second application. In some embodiments, the first application may be displayed in the virtual monitor in full screen. In response to the user selection of graphical element 1280, the virtualization environment can automatically determine that a new virtual monitor should be generated in which to display the second application. Accordingly, the new virtual monitor can be automatically generated, based on settings in the virtualization environment and/or stored user preferences. The virtual desktop can then be increased in size across the new virtual monitor, and the second application can be automatically displayed in the new virtual monitor. Alternatively, the user can be presented with one or more user interface screens after selecting the second application. For example, a first user interface screen can ask whether the user wishes to open the second application in a new virtual monitor. If the user desires to open a new virtual monitor, screens, such as screen 505 of FIG. 5A and/or screen 510 of FIG. 5B, can be displayed to determine a number of new virtual monitors to generate and/or characteristics for one or more new virtual monitors. In some embodiments, the second application can be displayed in the new virtual monitor in full screen.

The methods disclosed herein can be implemented as a computer program product, i.e., a computer program tangibly embodied in an information carrier, e.g., in a non-transitory machine-readable storage device or in a propagated signal, for execution by, or to control the operation of, a data processing apparatus, e.g., a programmable processor, a computer, or multiple computers. A computer program can be written in any form or programming language, including compiled or interpreted languages, and it can be deployed in any form, including as a stand-alone program or as one or more modules, one or more components, one or more subroutines, or one or more other units suitable for use in a computing environment. A computer program can be deployed to be executed on one computer or on multiple computers at one site or distributed across multiple sites and interconnected by a communication network.

In the preceding specification, the subject matter has been described with reference to specific exemplary embodiments. It will, however, be evident that various modifications and changes can be made without departing from the broader spirit and scope of the subject matter as set forth in the claims that follow. The specification and drawings are accordingly to be regarded as illustrative rather than restrictive. Other embodiments may be apparent to those skilled in the art from consideration of the specification and practice of the embodiments disclosed herein.

The invention claimed is:

1. A virtual server comprising: one or more processors that execute instructions to:
    generate a virtual desktop;
    generate at least one active virtual monitor and at least one paused virtual monitor for the generated virtual desktop;
    assign a first portion of the generated virtual desktop to the at least one active virtual monitor, and assign a second portion of the generated virtual desktop to the at least one paused virtual monitor;
    allocate a respective amount of memory for the at least one paused virtual monitor and for the at least one active virtual monitor, with a lesser amount of memory being allocated to the at least one paused virtual monitor until the at least one paused virtual monitor is selected as active; and
    provide a captured image of at least one of the first and second portions of the generated virtual desktop for presenting on a physical monitor of a client device.

2. The virtual server of claim 1, wherein an additional portion of the generated virtual desktop is not assigned to the at least one active virtual monitor and the at least one paused virtual monitor, and the captured image of the at least one of the first and second portions of the generated virtual desktop does not include the additional portion.

3. The virtual server of claim 1, wherein the one or more processors further execute the instructions to:
    identify a number of virtual monitors associated with the generated virtual desktop;
    identify characteristics of the virtual monitors; and
    with the at least one active virtual monitor and the at least one paused virtual monitor being generated based at least in part on the identified characteristics.

4. The virtual server of claim 3, wherein the generated virtual desktop is a virtualization of a desktop implemented on a physical computing device that is remote from the client device, and the characteristics correspond to characteristics of a physical monitor connected to the physical computing device.

5. The virtual server of claim 3, wherein the characteristics correspond to characteristics of the physical monitor of the client device.

6. The virtual server of claim 3, wherein the characteristics include at least one of an aspect ratio, resolution, dimension, type, refresh rate, number of pixels, video format, or contrast of the virtual monitors.

7. The virtual server of claim 1, wherein the one or more processors further execute the instructions to:
    receive an indication of a user selection to switch to the at least one paused virtual monitor; and
    provide the captured image of the second portion of the generated virtual desktop for presenting on the physical monitor of the client device in response to the received indication.

8. The virtual server of claim 1, wherein the one or more processors further execute the instructions to:
    identify first coordinates associated with a pointer displayed on the physical monitor of the client device;
    map the first coordinates to second coordinates associated with the first or second portion of the generated virtual desktop; and
    provide the pointer for display in the image of the first or second portion of the generated virtual desktop based on the mapping.

9. The virtual server of claim 1, further comprising:
    a first frame buffer associated with the first portion; and
    a second frame buffer associated with the second portion;
    wherein the captured image is stored in the first frame buffer or the second frame buffer, and the first frame buffer is updated at a higher frequency than the second frame buffer.

10. A method for providing virtual monitors comprising:
    generating a virtual desktop;
    generating at least one active virtual monitor and at least one paused virtual monitor for the generated virtual desktop;
    assigning a first portion of the generated virtual desktop to the at least one active virtual monitor, and assigning a second portion of the at least one generated virtual desktop to the at least one paused virtual monitor;
    allocating a respective amount of memory for the at least one paused virtual monitor and for the at least one active virtual monitor, with a lesser amount of memory being allocated to the at least one paused virtual monitor until the at least one paused virtual monitor is selected as active; and
    providing a captured image of at least one of the first and second portions of the generated virtual desktop for presenting on a physical monitor of a client device.

11. The method of claim 10, wherein an additional portion of the generated virtual desktop is not assigned to the at least one active virtual monitor and the at least one paused virtual monitor, and the captured image of the at least one of the first and second portions of the generated virtual desktop does not include the additional portion.

12. The method of claim 10, further comprising:
    identifying a number of virtual monitors associated with the generated virtual desktop;
    identifying characteristics of the virtual monitors; and
    with the at least one active virtual monitor and the at least one paused virtual monitor being generated based at least in part on the identified characteristics.

13. The method of claim 12, wherein the generated virtual desktop is a virtualization of a desktop implemented on a physical computing device that is remote from the client device, and the characteristics correspond to characteristics of a physical monitor connected to the physical computing device.

14. The method of claim 12, wherein the characteristics correspond to characteristics of the physical monitor of the client device.

15. The method of claim 12, wherein the characteristics include at least one of an aspect ratio, resolution, dimension, type, refresh rate, number of pixels, video format, or contrast of the virtual monitors.

16. The method of claim 10, further comprising:
receiving an indication of a user selection to switch to the at least one paused virtual monitor; and
providing the captured image of the second portion of the generated virtual desktop for presenting on the physical monitor of the client device in response to the received indication.

17. The method of claim 10, further comprising:
identifying first coordinates associated with a pointer displayed on the physical monitor of the client device;
mapping the first coordinates to second coordinates associated with the first or second portion of the generated virtual desktop; and
providing the pointer for display in the image of the first or second portion of the generated virtual desktop based on the mapping.

18. The method of claim 10, wherein a first frame buffer is associated with the first portion of the generated virtual desktop, and a second frame buffer is associated with the second portion of the generated virtual desktop, and the method further comprising:
storing the captured image in the first frame buffer or the second frame buffer, and
updating the first frame buffer at a higher frequency than the second frame buffer.

19. A non-transitory computer readable medium for operating a virtual server, and with the non-transitory computer readable medium having a plurality of computer executable instructions for causing the virtual server to perform steps comprising:
generating a virtual desktop;
generating at least one active virtual monitor and at least one paused virtual monitor for the generated virtual desktop;
assigning a first portion of the generated virtual desktop to the at least one active virtual monitor, and assigning a second portion of the at least one generated virtual desktop to the at least one paused virtual monitor;
allocating a respective amount of memory for the at least one paused virtual monitor and for the at least one active virtual monitor, with a lesser amount of memory being allocated to the at least one paused virtual monitor until the at least one paused virtual monitor is selected as active; and
providing a captured image of at least one of the first and second portions of the generated virtual desktop for presenting on a physical monitor of a client device.

20. The non-transitory computer-readable medium of claim 19, wherein an additional portion of the generated virtual desktop is not assigned to the at least one active virtual monitor and the at least one paused virtual monitor, and the captured image of the at least one of the first and second portions of the generated virtual desktop does not include the additional portion.

* * * * *